United States Patent
Hoang

(10) Patent No.: US 9,227,342 B2
(45) Date of Patent: Jan. 5, 2016

(54) ABRASIVE ARTICLE HAVING ABRASIVE SEGMENTS WITH SHAPED GULLET WALLS

(71) Applicants: Saint-Gobain Abrasives, Inc., Worcester, MA (US); Saint-Gobain Abrasifs, Conflans-Sainte-Honorine (FR)

(72) Inventor: Marc Linh Hoang, Thionville (FR)

(73) Assignees: SAINT-GOBAIN ABRASIVES, INC, Worcester, MA (US); SAINT-GOBAIN ABRASIF, Conflans-Sainte-Honorine (FR)

( * ) Notice: Subject to any disclaimer, the term of this patent is extended or adjusted under 35 U.S.C. 154(b) by 27 days.

(21) Appl. No.: 14/132,159

(22) Filed: Dec. 18, 2013

(65) Prior Publication Data

US 2014/0187131 A1    Jul. 3, 2014

Related U.S. Application Data

(60) Provisional application No. 61/747,968, filed on Dec. 31, 2012.

(51) Int. Cl.
*B24D 5/06* (2006.01)
*B24D 5/12* (2006.01)
*B28D 1/12* (2006.01)
*B23D 61/04* (2006.01)

(52) U.S. Cl.
CPC ............... *B28D 1/121* (2013.01); *B23D 61/04* (2013.01); *B24D 5/06* (2013.01); *B24D 5/12* (2013.01)

(58) Field of Classification Search
CPC ............ B24D 5/06; B24D 5/066; B24D 5/12; B24D 5/123; B28D 1/12; B28D 1/122

USPC .......................................... 451/541, 542, 543
See application file for complete search history.

(56) References Cited

U.S. PATENT DOCUMENTS 1,711,102 A    4/1929    Sierra, Jr.
1,723,843 A    8/1929    Chapin
(Continued)

FOREIGN PATENT DOCUMENTS

EP        0185136 A1    6/1986
JP     2002018729 A    1/2002
(Continued)

OTHER PUBLICATIONS

International Search Report for PCT Application No. PCT/US2013/076572 Dated Apr. 8, 2014.
(Continued)

*Primary Examiner* — Eileen Morgan
(74) *Attorney, Agent, or Firm* — Abel Law Group, LLP; Joseph P Sullivan

(57) ABSTRACT

A segment for an abrasive article is disclosed. The segment can include a segment body that can have a first face that can extend along a length of the segment body on a first side of the segment body and a second face that can extend along the length of the segment body on a second side of the segment body opposite the first side. A gullet wall can extend from the first face to the second face. The gullet wall can extend along a gullet. The segment can also include a recessed region that can extend into one or both of the first and second faces. The recessed region can include a gullet portion extending at least partially along the gullet wall.

20 Claims, 8 Drawing Sheets

(56) References Cited

U.S. PATENT DOCUMENTS

| | | |
|---|---|---|
| 2,013,943 A | 9/1935 | Allen |
| 2,544,632 A * | 3/1951 | Holter et al. .................. 451/542 |
| 3,064,399 A | 11/1962 | Anderson |
| 3,072,470 A * | 1/1963 | Hinshaw ......................... 51/293 |
| 3,092,094 A * | 6/1963 | Griffin et al. .................... 125/15 |
| 3,107,706 A | 10/1963 | Heinemann |
| 3,128,755 A | 4/1964 | Benson |
| 3,363,617 A | 1/1968 | Hoerer |
| 3,563,286 A | 2/1971 | Strobel et al. |
| 3,579,928 A | 5/1971 | Held |
| 3,700,016 A | 10/1972 | Strobel |
| 3,730,038 A | 5/1973 | Farb |
| 3,981,216 A | 9/1976 | Lemmon |
| 4,135,421 A | 1/1979 | Bertram et al. |
| 4,240,315 A | 12/1980 | Tuomaala |
| 4,267,814 A | 5/1981 | Benson et al. |
| 4,333,371 A | 6/1982 | Matsuda |
| 4,516,560 A * | 5/1985 | Cruickshank et al. .......... 125/15 |
| 4,705,017 A | 11/1987 | Lewis |
| D293,074 S | 12/1987 | Inoue |
| 4,848,205 A | 7/1989 | Suzuki et al. |
| 4,854,295 A | 8/1989 | Sakarcan |
| 5,040,341 A * | 8/1991 | Okinaga ....................... 451/541 |
| 5,054,354 A | 10/1991 | Kubis |
| 5,184,597 A * | 2/1993 | Chiuminatta et al. .......... 125/15 |
| D337,713 S | 7/1993 | Johnston |
| D341,304 S | 11/1993 | Johnston |
| D345,683 S | 4/1994 | Johnston |
| 5,351,595 A | 10/1994 | Johnston |
| 5,392,759 A * | 2/1995 | Kwang .......................... 125/15 |
| 5,438,900 A | 8/1995 | Sundstrom |
| 5,524,518 A | 6/1996 | Sundstrom |
| 5,555,788 A | 9/1996 | Gakhar et al. |
| D397,012 S | 8/1998 | Hariu |
| D401,829 S | 12/1998 | Hariu |
| 5,896,800 A | 4/1999 | Curtsinger et al. |
| 6,065,370 A | 5/2000 | Curtsinger et al. |
| D447,496 S | 9/2001 | Lee et al. |
| D458,948 S | 6/2002 | Chianese et al. |
| 6,408,838 B1 | 6/2002 | Ogata et al. |
| D459,740 S | 7/2002 | Chianese et al. |
| 6,878,051 B2 * | 4/2005 | Brach ........................... 451/542 |
| D513,952 S | 1/2006 | Lee et al. |
| 7,240,597 B2 | 7/2007 | Sakai et al. |
| 7,353,819 B2 * | 4/2008 | Lee et al. ......................... 125/22 |
| 7,497,212 B2 * | 3/2009 | Choi et al. ...................... 125/15 |
| 7,946,907 B2 | 5/2011 | Heyen |
| 2002/0119742 A1 * | 8/2002 | Nakagawa et al. ........... 451/542 |
| 2003/0213483 A1 | 11/2003 | Sakarcan |
| 2004/0149114 A1 | 8/2004 | Brach |
| 2006/0213495 A1 | 9/2006 | Gaida et al. |
| 2009/0199693 A1 | 8/2009 | Heyen |
| 2014/0010998 A1 * | 1/2014 | Hoang .......................... 428/172 |
| 2014/0030970 A1 * | 1/2014 | Hoang et al. .................. 451/542 |

FOREIGN PATENT DOCUMENTS

| | | |
|---|---|---|
| KR | 100337655 B1 | 5/2002 |
| WO | 0170471 A1 | 9/2001 |
| WO | 2004071697 A2 | 8/2004 |
| WO | 2014105639 A1 | 7/2014 |

OTHER PUBLICATIONS

Amazon.com; "Bosch DBSW961 Speedwave 9" Segmented Diamond Blade; http://www.amazon.com/Bosch-DBSW961-Speedwave-Segmented-Diamond/dp/B000PI8WMK/ref=sr_1_1?ie=UTF8&qid=1379346010&sr=8-1&keywords=dbsw961, Jul. 2, 2004, 4 pages.

Amazon.com; "EDCO 39701 Concrete Walk-Behind Saw 10-Inch Diamond Blade," http://www.amazon.com/39701-Concrete-Walk-Behind-10-Inch-Diamond/dp/B004K1F604/ref=sr_1_1?ie=UTF8&qid=1379346082&sr=8-1&keywords=39701, Jan. 21, 2011, 4 pages.

Amazon.com; "MK Diamond 162785 MK-304RCK Tiger Tooth 4-1/2-Inch Premium Demolition Blade," http://www.amazon.com/MK-Diamond-162785-MK-304RCK-Demolition/dp/B000NBDGX4/ref=sr_1_1?ie=UTF8&qid=1379346164&sr=8-1&keywords=162785, Feb. 8, 2006, 5 pages.

U.S. Appl. No. 29/441,129, filed Dec. 31, 2012, 4 pages.

* cited by examiner

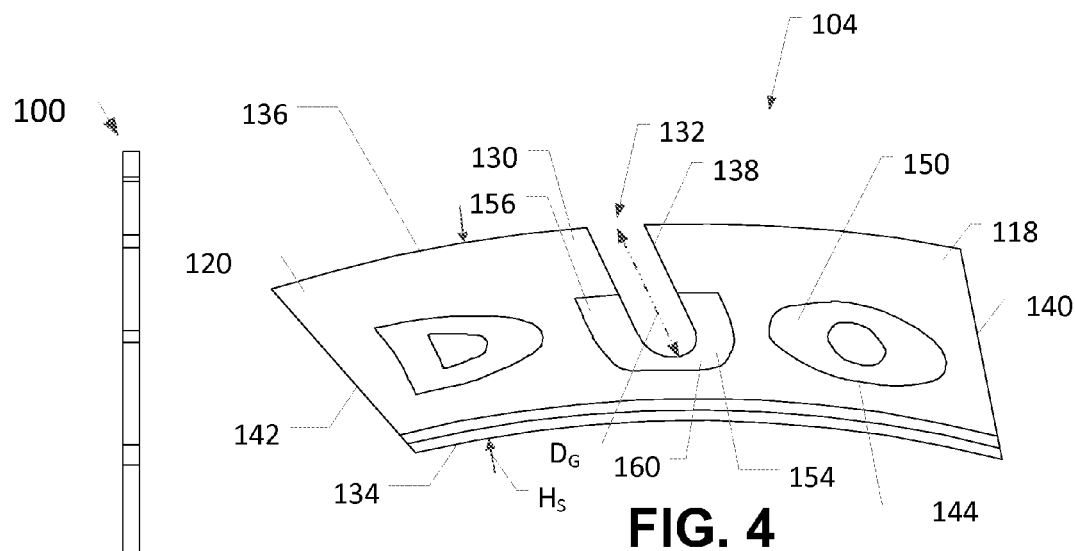
FIG. 4
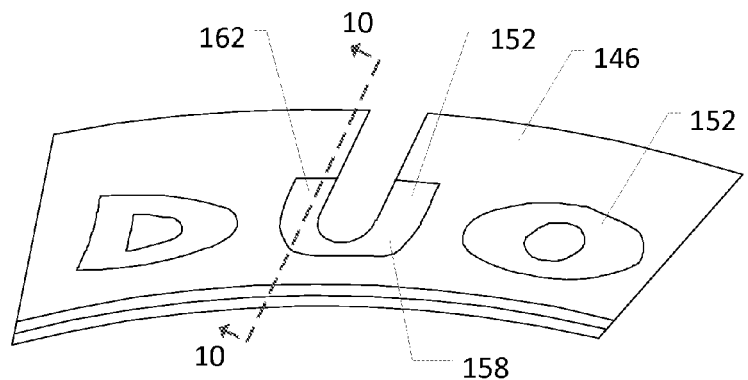
FIG. 5
FIG. 3

ABRASIVE ARTICLE HAVING ABRASIVE SEGMENTS WITH SHAPED GULLET WALLS

CROSS-REFERENCE TO RELATED APPLICATION(S)

This application claims priority to U.S. Patent Application No. 61/747,968 entitled "Abrasive Article Having Abrasive Segments with Shaped Gullet Walls," by Marc Linh Hoang, filed Dec. 31, 2012, which application is assigned to the current assignees hereof and incorporated herein by reference in its entirety.

BACKGROUND

1. Field of the Disclosure

The following is generally directed to abrasive tools and processes for forming same, and more particularly, to abrasive tools utilizing abrasive segments attached to a base and methods of assembling such tools.

2. Description of the Related Art

Tools necessary for furthering infrastructure improvements, such as building additional roads and buildings, are vital to the continued economic expansion of developing regions. Additionally, developed regions have a continuing need to replacing aging infrastructure with new and expanded roads and buildings.

The construction industry utilizes a variety of tools for cutting and grinding of construction materials. Cutting and grinding tools are required for to remove or refinish old sections of roads. Additionally, quarrying and preparing finishing materials, such as stone slabs used for floors and building facades, require tools for drilling, cutting, and polishing. Typically, these tools include abrasive segments bonded to a base element or core, such as a plate or a wheel. As with other industries, improvements to these abrasive tools are always sought.

BRIEF DESCRIPTION OF THE DRAWINGS

The present disclosure may be better understood, and its numerous features and advantages made apparent to those skilled in the art by referencing the accompanying drawings.

FIG. 3 includes a third plan view of an abrasive article in accordance with an embodiment.

FIG. 4 includes a first plan view of a segment in accordance with an embodiment.

FIG. 5 includes a second plan view of a segment in accordance with an embodiment.

The use of the same reference symbols in different drawings indicates similar or identical items.

DETAILED DESCRIPTION

According to an embodiment, the abrasive article herein can include a core and a plurality of abrasive segments affixed to the core. The abrasive article can be a cutting tool for cutting construction materials, such as a saw for cutting concrete. Alternatively, the abrasive article can be a grinding tool such as for grinding concrete or fired clay or removing asphalt.

In general, the abrasive article can include multiple segments affixed to a core. The segments can include a first segment indicia on a first face and second segment indicia on a second face opposite the first face. The segments can be arranged with respect to each other on the core to define first abrasive article indicia on a first side of the core and a second abrasive article indicia on a second side of the core. The first abrasive article indicia can include multiple instances of the first segment indicia formed in each segment. The second abrasive article indicia can include multiple instances of the second segment indicia formed in each segment. A portion of the first segment indicia and the second segment indicia can include a gullet portion that can flank an inter-segment gullet formed between adjacent segments or an intra-segment gullet formed within the segment.

Figure 1:
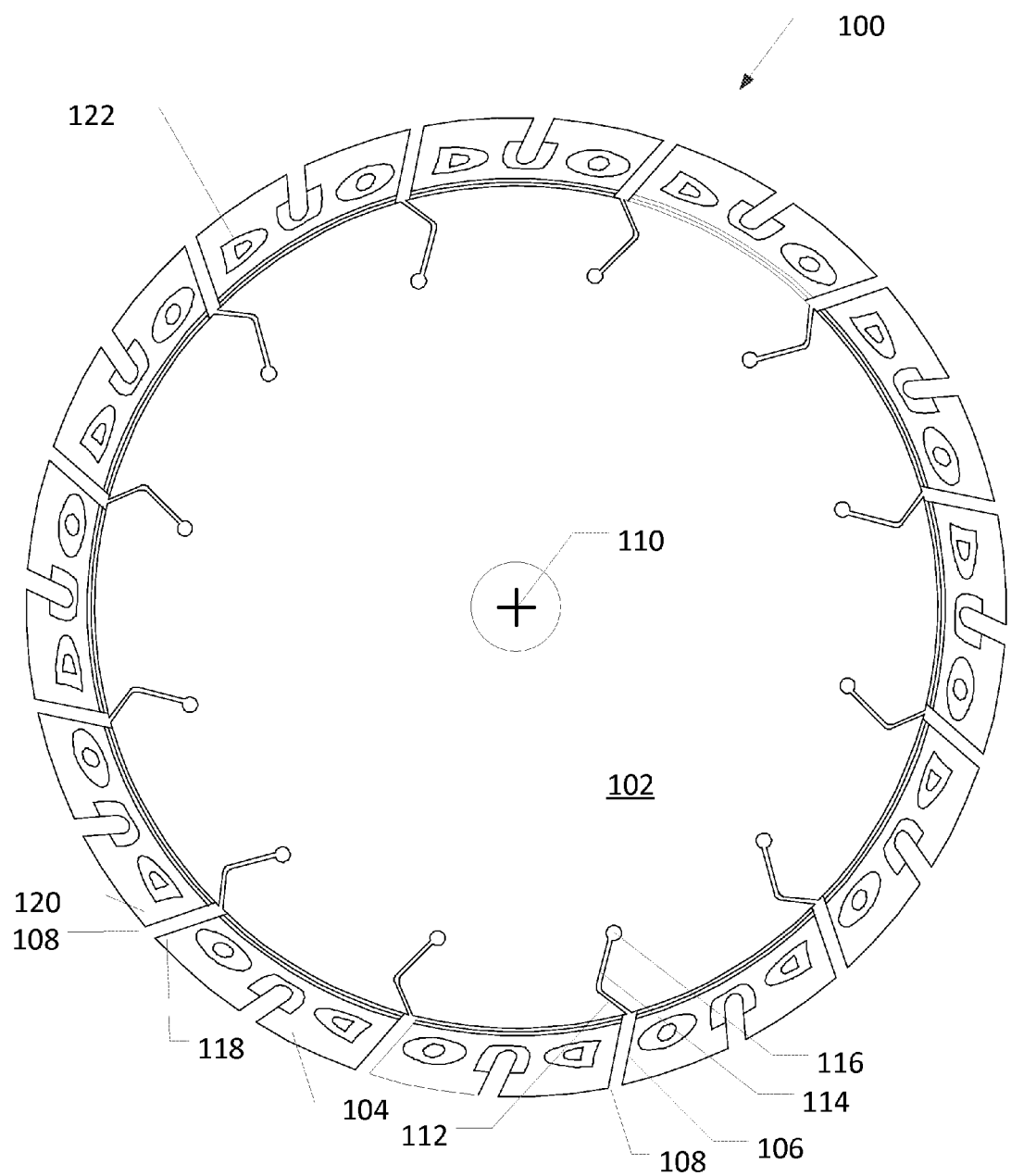
FIG. 1 includes a first plan view of an abrasive article in accordance with an embodiment.
Figure 2:
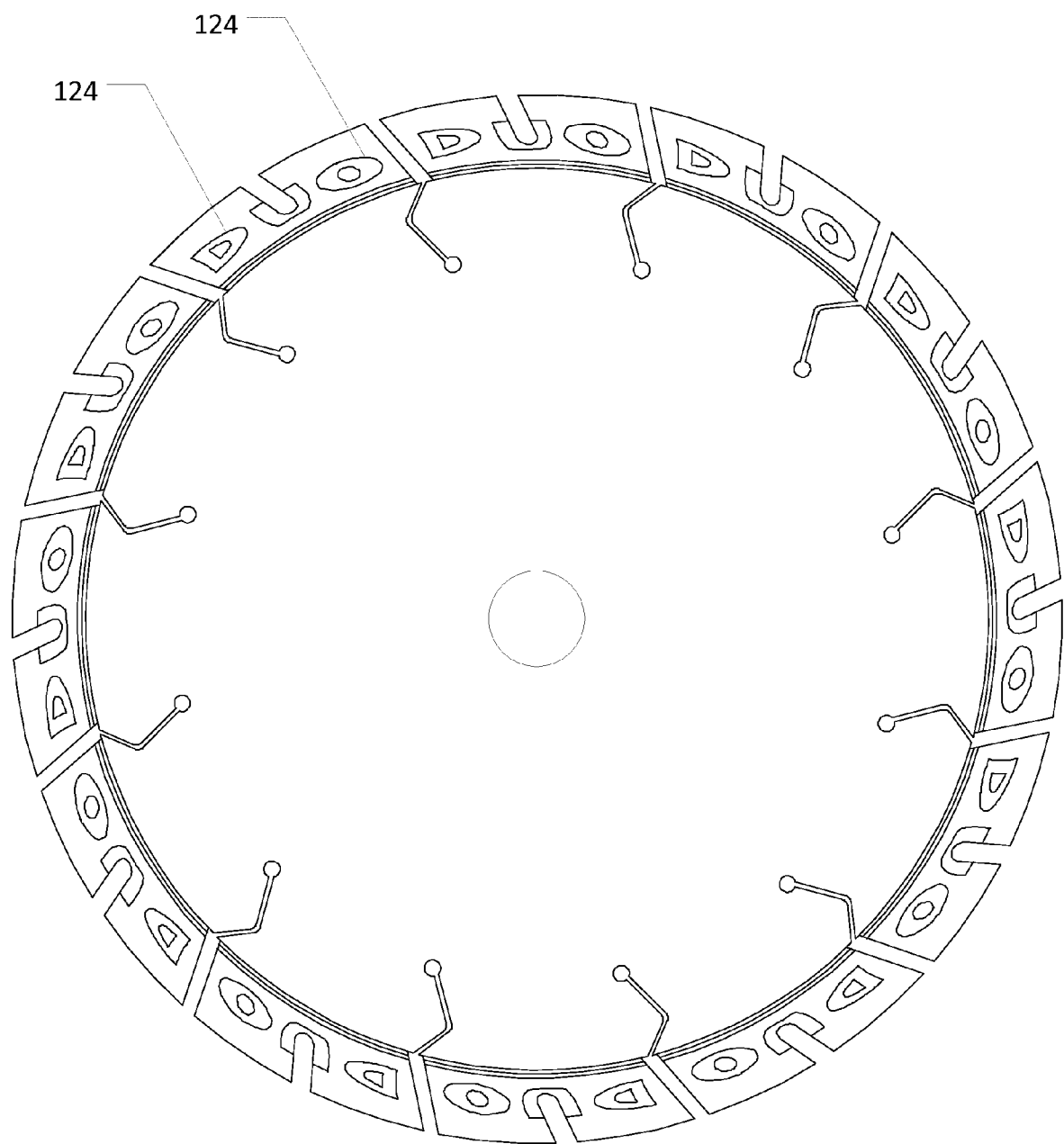
FIG. 2 includes a second plan view of an abrasive article in accordance with an embodiment.
Figure 6:
FIG. 6 includes a third plan view of a segment in accordance with an embodiment.
Figure 7:
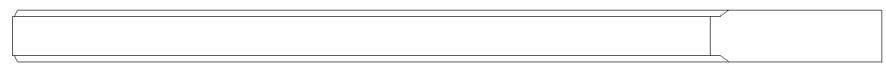
FIG. 7 includes a fourth plan view of a segment in accordance with an embodiment.
Figure 8:
FIG. 8 includes a fifth plan view of a segment in accordance with an embodiment.
Figure 9:
FIG. 9 includes a sixth plan view of a segment in accordance with an embodiment.

FIG. 1 through FIG. 10 illustrate an exemplary abrasive article designated 100. Specifically, FIG. 1 includes a front plan view of the abrasive article 100. FIG. 2 includes a rear plan view. FIG. 3 includes a top, bottom, or side plan view of the abrasive article 100. FIG. 4 includes a front plan view of a segment for an abrasive article 100. FIG. 5 includes a rear plan view of the segment. FIG. 6 includes a top plan view. FIG. 7 includes a bottom plan view. FIG. 8 and FIG. 9 include side plan views of the segment and FIG. 10 includes a cross-sectional view of the segment.

Figure 11:
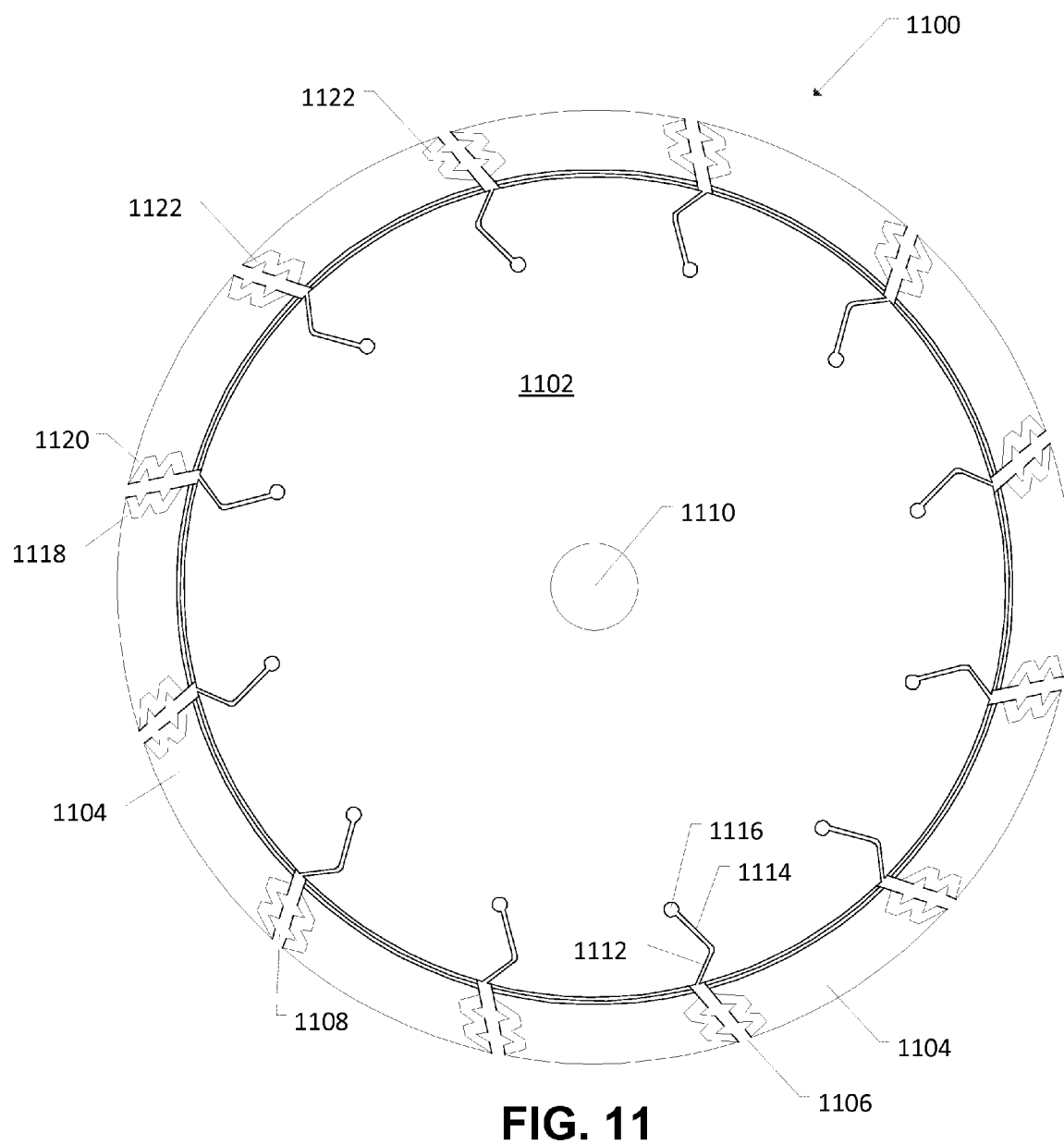
FIG. 11 includes a first plan view of an abrasive article in accordance with another embodiment.
Figure 12:
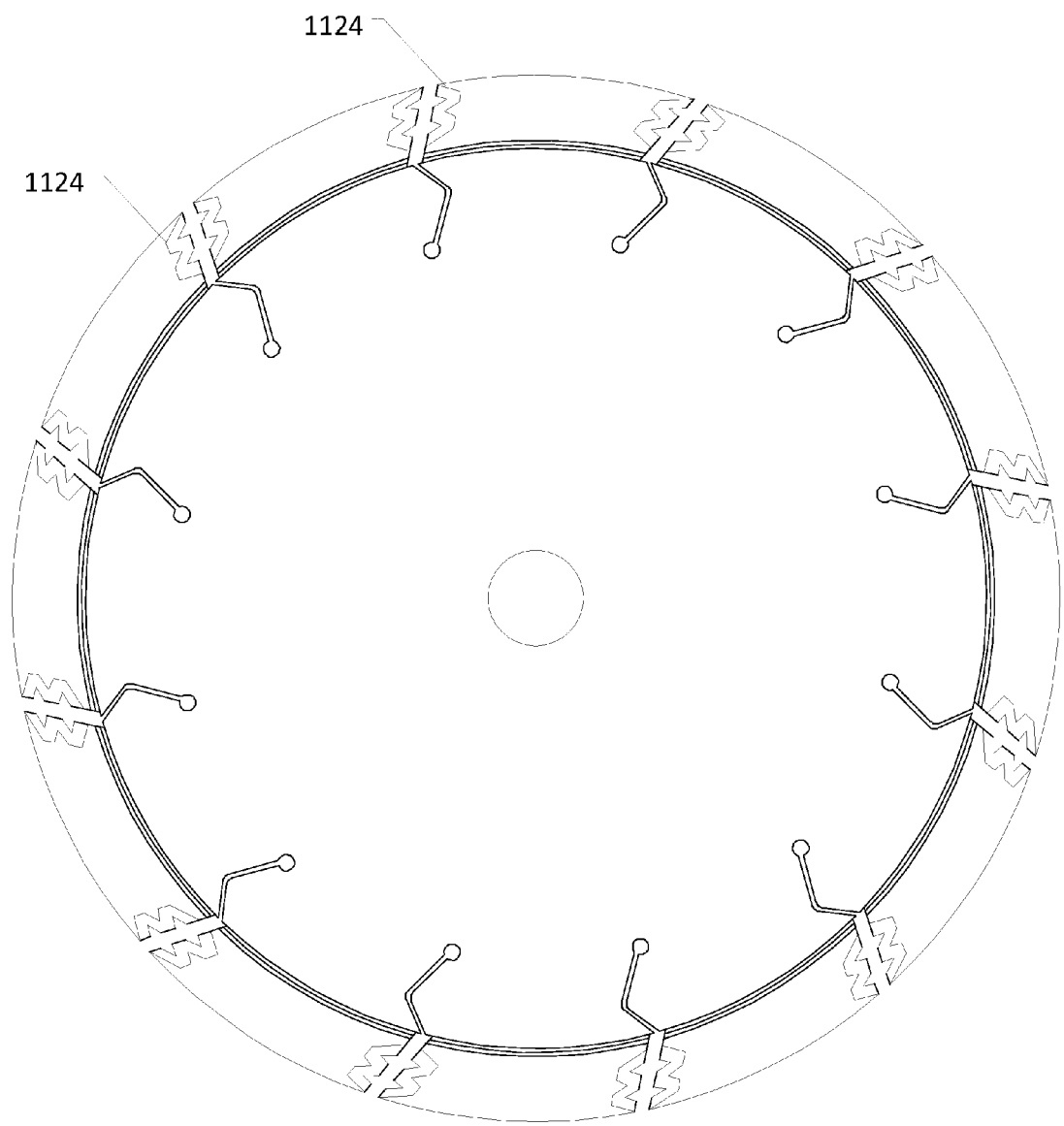
FIG. 12 includes a second plan view of an abrasive article in accordance with another embodiment.
Figure 14:
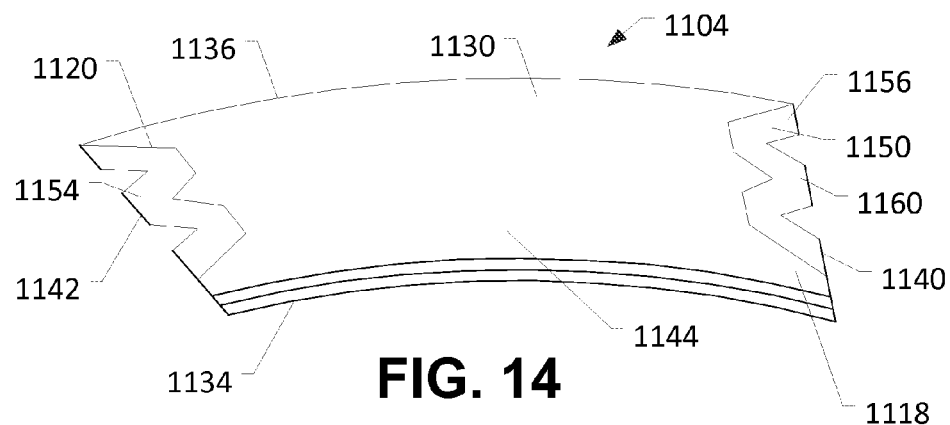
FIG. 14 includes a first plan view of a segment in accordance with another embodiment.
Figure 15:
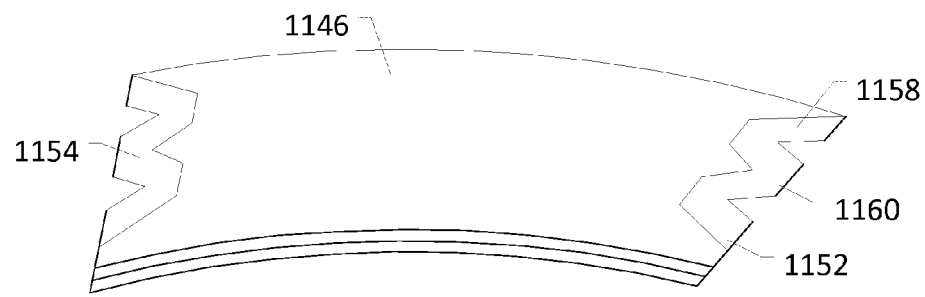
FIG. 15 includes a second plan view of a segment in accordance with another embodiment.
Figures 13, 16, 17:
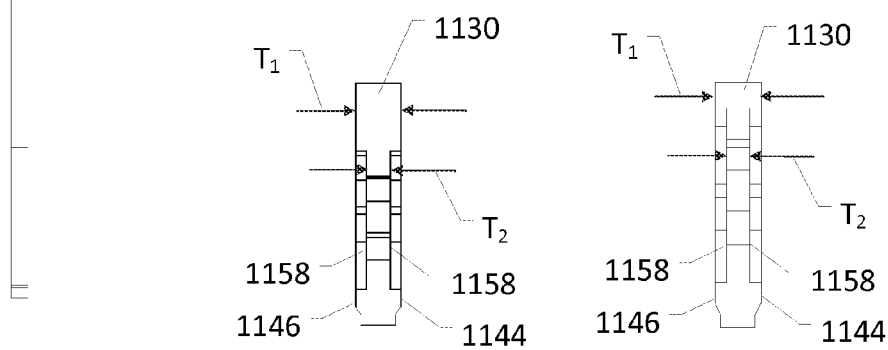
FIG. 13 includes a third plan view of an abrasive article in accordance with another embodiment.
FIG. 16 includes a third plan view of a segment in accordance with another embodiment.
FIG. 17 includes a fourth plan view of a segment in accordance with another embodiment.
Figure 18:
FIG. 18 includes a fifth plan view of a segment in accordance with another embodiment.
Figure 19:
FIG. 19 includes a sixth plan view of a segment in accordance with another embodiment.

FIG. 11 through FIG. 19 illustrate another exemplary abrasive article that is designated 1100. In particular, FIG. 11 includes a front plan view of the abrasive article 1100. FIG. 12 includes a rear plan view. FIG. 13 includes a top, bottom, or side plan view of the abrasive article 1100. FIG. 14 includes a front plan view of a segment for an abrasive article 1100. FIG. 15 includes a rear plan view of the segment 1100. FIG. 16 and FIG. 17 include side plan views of the segment. FIG. 18 includes a top plan view and FIG. 19 includes a bottom plan view.

Referring to FIG. 1 through FIG. 10, the abrasive article 100 can include a core 102. A plurality of segments 104 can extend outwardly from a perimeter, or circumference, of the core 102. The segments 104 can be formed separately from the core, as described herein, and affixed to the core via a brazing procedure, a welding procedure, a mechanical coupling, etc. In a particular aspect, each adjacent pair of segments 104 can be separated by a gap, such as an inter-segment gullet 106.

Each inter-segment gullet 106 can include a first portion 108 that extends from the outer periphery, or circumference, of the adjacent segments 104 inward at an angle with respect to a line passing through a center 110 of the core 102 and the center of the base of the first portion 108 of the inter-segment gullet 106 at the outer perimeter of the core 102. As illustrated, the center 110 of the core 102 is also the center of the abrasive article 100. The first portion 108 of the inter-segment gullet 106 can extend to a second portion 112 of the inter-segment gullet 106 that extends into the core 102. The second portion 112 can extend from an outer periphery of the core 102 into the core 102 at a second angle in a direction that is opposite the first portion 108 of the inter-segment gullet 106. The second portion 112 of the inter-segment gullet 106 can extend to a third portion 114 of the inter-segment gullet 106 that extends further into the core 102. The third portion 114 can extend from the second portion 112 at a third angle in a direction that is opposite the second portion 112 of the inter-segment gullet 106 and in the same general direction as the first portion 108 of the inter-segment gullet 106. The third portion 112 of the inter-segment gullet 106 can terminate in a generally circular end 116. The circular end 116 can be a bore formed through core 102. Moreover, the circular end 116 can lie substantially along the line passing through the center 110 of the core 102 and the center of the base of the first portion 108 of the inter-segment gullet 106 at the outer perimeter of the core 102. In particular, a center of the circular end 116 can lie along that line.

The first portion 108 of the inter-segment gullet 106 can include an open space between two adjacent segments 104 that is defined by a leading end 118 of a first segment in the pair of segments and a trailing end 120 of a second segment in the pair of segments 104. The second portion 112 and the third portion 114 of the inter-segment gullet 106 can include a slot cut into the core 102.

In a particular aspect, the first portion 108 of the inter-segment gullet 106 can have a first width and the second portion 112 and third portion 114 of each inter-segment gullet 106 can include a second width. The first width can be greater than the second width. The end 116 of the inter-segment gullet 106 can have a diameter and the diameter can be greater than the first width.

In a particular aspect, as illustrated in FIG. 1 and FIG. 2, the segments 104 are all identical to each other and can be arranged on the core 102 to form a first abrasive article indicia 122 around the outer periphery of the core 102 on a first side of the abrasive article 100 and a second abrasive article indicia 124 around the outer periphery of the core 102 on a second side of the abrasive article 100 opposite the first side. For example, the segments 104 and the abrasive article indicia 122, 124 can be arranged in a ring around the core 102.

As most clearly illustrated in FIG. 4 and FIG. 5, each abrasive segment 104 can include a segment body 130. The segment body 130 can be curved. In other aspects, the segment body 130 can be generally rectangular. The segment body 130 can include an intra-segment gullet 132 formed in the segment body 132 between the leading end 118 and trailing end 120 of the segment 104. The intra-segment gullet 132 can be bound by a gullet wall 138. The intra-segment gullet 132 can pass through a midpoint of the segment 104. In a particular aspect, the segment 104 can include a height, $H_S$, measured along a radial axis passing through the center 110 of the core 102 and the segment 104 from an inner circumferential wall 134 to an outer circumferential wall 136 of the segment 104. Moreover, the intra-segment gullet 132 can include a depth, $D_G$, measured along a central axis bisecting the intra-segment gullet 132.

In a particular aspect, the intra-segment gullet 132 can extend from the outer circumferential wall 136 toward the inner circumferential wall 134, but not to the inner circumferential wall 134 such that $D_G < H_S$. For example, $D_G$ can be ≤80% $H_S$, such ≤75% $H_S$, ≤70% $H_S$, or ≤65% $H_S$. Further, $D_G$ can be ≥40% $H_S$, such as ≥45% $H_S$, ≥50% $H_S$, ≥55% $H_S$, or ≥60% $H_S$. $D_G$ can be within a range between and including any of the maximum and minimum values of $D_G$ described herein.

For example, $D_G$ can be ≤80% $H_S$ and ≥40% $H_S$, such as ≤80% $H_S$ and ≥45% $H_S$, ≤80% $H_S$ and ≥50% $H_S$, ≤80% $H_S$ and ≥55% $H_S$, or ≤80% $H_S$ and ≥60% $H_S$. Moreover, $D_G$ can be ≤75% $H_S$ and ≥40% $H_S$, such as ≤75% $H_S$ and ≥45% $H_S$, ≤75% $H_S$ and ≥50% $H_S$, ≤75% $H_S$ and ≥55% $H_S$, or ≤75% $H_S$ and ≥60% $H_S$. $D_G$ can be ≤70% $H_S$ and ≥40% $H_S$, such as ≤70% $H_S$ and ≥45% $H_S$, ≤70% $H_S$ and ≥50% $H_S$, ≤70% $H_S$ and ≥55% $H_S$, or ≤70% $H_S$ and ≥60% $H_S$. Further, $D_G$ can be ≤65% $H_S$ and ≥40% $H_S$, such as ≤65% $H_S$ and ≥45% $H_S$, ≤65% $H_S$ and ≥50% $H_S$, ≤65% $H_S$ and ≥55% $H_S$, or ≤65% $H_S$ and ≥60% $H_S$.

In a particular aspect, the segment body 130 can further include a first radial sidewall 140 at the leading end 118 of the segment 104. The first radial sidewall 140 can extend between the inner and outer circumferential walls 134, 136. The segment body 130 can also include a second radial sidewall 142 at the trailing end 120 of the segment 104. The second radial sidewall 142 can extend between the inner and outer circumferential walls 134, 136 opposite the first radial sidewall 140. A first face 144 can extend between the inner and outer circumferential walls 134, 136 and the radial sidewalls 140, 142. Further, a second face 146 can extend between the inner and outer circumferential walls 134, 136 and the radial sidewalls 140, 142 opposite the first face 144.

As depicted, the segment 104 can include first and second segment indicia 150, 152 formed in the first and second faces 144, 146, respectively, of the segment body 130. The indicia 150, 152 can include a recessed region 154 that can extend into the first face 144, the second face 146, or both the first and second faces 144, 146. In particular, the recessed region 154 can be a bilateral recessed region 154 that can include a first recessed region 156 extending into the first face 144 and a second recessed region 158 extending into the second face 146 opposite the first recessed region 156. The first and second recessed regions 156, 158 can be mirror opposites of each other. As illustrated, each recessed region 156, 158 can include a gullet portion 160, 162 that can extend at least partially along the intra-segment gullet 132 and the gullet wall 138. In other words, the intra-segment gullet 132 and the gullet wall 138 can extend at least partially into the bilateral recessed region 154 to establish the gullet portion 160, 162 of the recessed region 156, 152.

In a particular aspect, the gullet wall 138 can include a length, $L_{GW}$, measured along the entire periphery of the intra-segment gullet 132 and the gullet portion 160, 162 of each recessed region 156, 158 can extend along a length, $L_{GP}$, comprising a portion of $L_{GW}$, and $L_{GP} < L_{GW}$. For example, $L_{GP}$ can be ≤95% $L_{GW}$, such as ≤90% $L_{GW}$, ≤85% $L_{GW}$, ≤80% $L_{GW}$, ≤75% $L_{GW}$, or ≤70% $L_{GW}$. Moreover, $L_{GP}$ can be ≥25% $L_{GW}$, such as ≥30% $L_{GW}$, ≥35% $L_{GW}$, or ≥40% $L_{GW}$. In a further aspect, $L_{GP}$ can be within a range between and including any of the maximum and minimum values of $L_{GP}$ described herein.

For example, $L_{GP}$ can be ≤90% $L_{GW}$ and ≥25% $L_{GW}$, such as ≤90% $L_{GW}$ and ≥30% $L_{GW}$, ≤90% $L_{GW}$ and ≥35% $L_{GW}$, or ≤90% $L_{GW}$ and ≥40% $L_{GW}$. Further, $L_{GP}$ can be ≤85% $L_{GW}$ and ≥25% $L_{GW}$, such as ≤85% $L_{GW}$ and ≥30% $L_{GW}$, ≤85% $L_{GW}$ and ≥35% $L_{GW}$, or ≤85% $L_{GW}$ and ≥40% $L_{GW}$. $L_{GP}$ can be ≤80% $L_{GW}$ and ≥25% $L_{GW}$, such as ≤80% $L_{GW}$ and ≥30% $L_{GW}$, ≤80% $L_{GW}$ and ≥35% $L_{GW}$, or ≤80% $L_{GW}$ and ≥40% $L_{GW}$. Still further, $L_{GP}$ can be ≤75% $L_{GW}$ and ≥25% $L_{GW}$, such as ≤75% $L_{GW}$ and ≥30% $L_{GW}$, ≤75% $L_{GW}$ and ≥35% $L_{GW}$, or ≤75% $L_{GW}$ and ≥40% $L_{GW}$. Moreover, $L_{GP}$ can be ≤70% $L_{GW}$ and ≥25% $L_{GW}$, such as ≤70% $L_{GW}$ and ≥30% $L_{GW}$, ≤70% $L_{GW}$ and ≥35% $L_{GW}$, or ≤70% $L_{GW}$ and ≥40% $L_{GW}$.

Figure 10:
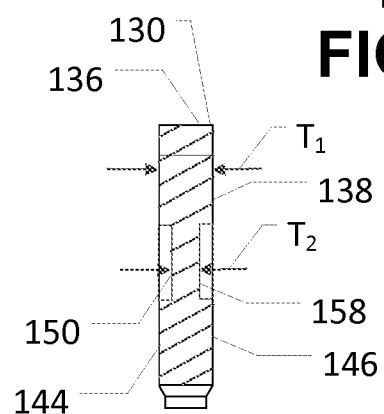
FIG. 10 includes a cross-sectional view of a segment taken along line 10-10 in FIG. 5 in accordance with an embodiment.

As indicated in FIG. 10, the segment body 130 can include a first thickness, $T_1$, measured between the first face 144 and the second face 146 of the segment body 130, e.g., at the gullet wall 138. Further, the segment body 130 can include a second thickness, $T_2$, measured at the first recessed portion 150 and the second recessed region 158, e.g., at the gullet wall 138. In a particular aspect, $T_2$ can be <$T_1$. For example, $T_2$ can be ≤80% $T_1$, such ≤75% $T_1$, ≤70% $T_1$, or ≤65% $T_1$. Moreover, $T_2$ can be ≥40% $T_1$, such as ≥45% $T_1$, ≥50% $T_1$, ≥55% $T_1$, or ≥60% $T_1$. In another aspect, $T_2$ can be within a range between and including any of the maximum and minimum values of $T_2$ described herein.

For example, $T_2$ can be ≤80% $T_1$ and ≥40% $T_1$, such as ≤80% $T_1$ and ≥45% $T_1$, ≤80% $T_1$ and ≥50% $T_1$, ≤80% $T_1$ and ≥55% $T_1$, or ≤80% $T_1$ and ≥60% $T_1$. In another aspect, $T_2$ can be ≤75% $T_1$ and ≥40% $T_1$, such as ≤75% $T_1$ and ≥45% $T_1$, ≤75% $T_1$ and ≥50% $T_1$, ≤75% $T_1$ and ≥55% $T_1$, or ≤75% $T_1$ and ≥60% $T_1$. Further, $T_2$ can be ≤70% $T_1$ and ≥40% $T_1$, such as ≤70% $T_1$ and ≥45% $T_1$, ≤70% $T_1$ and ≥50% $T_1$, ≤70% $T_1$ and ≥55% $T_1$, or ≤70% $T_1$ and ≥60% $T_1$. Still further, $T_2$ can be ≤65% $T_1$ and ≥40% $T_1$, such as ≤65% $T_1$ and ≥45% $T_1$, ≤65% $T_1$ and ≥50% $T_1$, ≤65% $T_1$ and ≥55% $T_1$, or ≤65% $T_1$ and ≥60% $T_1$.

Accordingly, the gullet wall 138 can have a first width, $W_1$, and a second width, $W_2$, and $W_2$ can be <$W_1$. For example, $W_2$ can be ≤80% $W_1$, such ≤75% $W_1$, ≤70% $W_1$, or ≤65% $W_1$. Moreover, $W_2$ can be ≥40% $W_1$, such as ≥45% $W_1$, ≥50% $W_1$, ≥55% $W_1$, or ≥60% $W_1$. In another aspect, $W_2$ can be within a range between and including any of the maximum and minimum values of $W_2$ described herein.

For example, $W_2$ can be ≤80% $W_1$ and ≥40% $W_1$, such as ≤80% $W_1$ and ≥45% $W_1$, ≤80% $W_1$ and ≥50% $W_1$, ≤80% $W_1$ and ≥55% $W_1$, or ≤80% $W_1$ and ≥60% $W_1$. In another aspect, $W_2$ can be ≤75% $W_1$ and ≥40% $W_1$, such as ≤75% $W_1$ and ≥45% $W_1$, ≤75% $W_1$ and ≥50% $W_1$, ≤75% $W_1$ and ≥55% $W_1$, or ≤75% $W_1$ and ≥60% $W_1$. Further, $W_2$ can be ≤70% $W_1$ and ≥40% $W_1$, such as ≤70% $W_1$ and ≥45% $W_1$, ≤70% $W_1$ and ≥50% $W_1$, ≤70% $W_1$ and ≥55% $W_1$, or ≤70% $W_1$ and ≥60% $W_1$. Still further, $W_2$ can be ≤65% $W_1$ and ≥40% $W_1$, such as ≤65% $W_1$ and ≥45% $W_1$, ≤65% $W_1$ and ≥50% $W_1$, ≤65% $W_1$ and ≥55% $W_1$, or ≤65% $W_1$ and ≥60% $W_1$.

In another aspect, the first face 144 and the second face 146 of the segment body 130 can include a first surface roughness, $R_1$. The face of first recessed region 156 and the face of the second recessed region 158 can include a second surface roughness, $R_2$. In this aspect, $R_2$ can be <$R_1$. For example, $R_2$ can be ≤50% $R_1$, such ≤45% $R_1$, ≤40% $R_1$, or ≤35% $T_1$. Moreover, $R_2$ can be ≥1% $R_1$, such as ≥2.5% $R_1$ or ≥5% $R_1$. In addition, $R_2$ can be within a range between and including any of the maximum and minimum values of $R_2$ described herein.

For example, $R_2$ can be ≤50% $R_1$ and ≥1% $R_1$, such as ≤50% $R_1$ and ≥2.5% $R_1$ or ≤50% $R_1$ and ≥5% $R_1$. Further, $R_2$ can be ≤45% $R_1$ and ≥1% $R_1$, such as ≤45% $R_1$ and ≥2.5% $R_1$ or ≤45% $R_1$ and ≥5% $R_1$. $R_2$ can be ≤40% $R_1$ and ≥1% $R_1$, such as ≤40% $R_1$ and ≥2.5% $R_1$ or ≤40% $R_1$ and ≥5% $R_1$. Still further, $R_2$ can be ≤35% $R_1$ and ≥1% $R_1$, such as ≤35% $R_1$ and ≥2.5% $R_1$ or ≤35% $R_1$ and ≥5% $R_1$.

In yet another aspect, the segment 104, or segment body 130, can include a circumferential length, $L_S$, measured from the first radial sidewall 140 to the second radial sidewall 142 along the outer circumferential wall 136. The intra-segment gullet 132 can include a circumferential width, $W_G$, measured along an axis perpendicular to a longitudinal axis that bisects the intra-segment gullet 132 and in this aspect, $W_G$ can be <$L_S$. For example, $W_G$ can be ≤20% $L_S$, such ≤15% $L_S$, or ≤10% $L_S$. Also, $W_G$ can be ≥2.5% $L_S$, such as ≥5% $L_S$ or ≥7.5% $L_S$. Additionally, $W_G$ can be within a range between and including any of the maximum and minimum values of $W_G$ described herein.

For example, $W_G$ can be ≤20% $L_S$ and ≥2.5% $L_S$, such as ≤20% $L_S$ and ≥5% $L_S$ or ≤20% $L_S$ and ≥7.5% $L_S$. Further, $W_G$ can be ≤15% $L_S$ and ≥2.5% $L_S$, such as ≤15% $L_S$ and ≥5% $L_S$ or ≤15% $L_S$ and ≥7.5% $L_S$. Further still, $W_G$ can be ≤10% $L_S$ and ≥2.5% $L_S$, such as ≤10% $L_S$ and ≥5% $L_S$ or ≤10% $L_S$ and ≥7.5% $L_S$.

In another aspect, the gullet portion 160, 162 of each recessed region 156, 158 can include an overall width, $W_{RR}$, measured along the perpendicular axis or an axis parallel to the perpendicular axis, and $W_G$ can be <$W_{RR}$. For example, $W_G$ can be ≤50% $W_{RR}$, such ≤45% $W_{RR}$, or ≤30% $W_{RR}$. Further, $W_G$ can be ≥5% $W_{RR}$, such as ≥10% $W_{RR}$ or ≥20% $W_{RR}$. In another aspect, $W_G$ can be within a range between and including any of the maximum and minimum values of $W_G$ described herein.

For example, $W_G$ can be ≤50% $W_{RR}$ and ≥5% $W_{RR}$, such as ≤50% $W_{RR}$ and ≥10% $W_{RR}$, or ≤50% $W_{RR}$ and ≥20% $W_{RR}$. Further, $W_G$ can be ≤45% $W_{RR}$ and ≥5% $W_{RR}$, such as ≤45% $W_{RR}$ and ≥10% $W_{RR}$, or ≤45% $W_{RR}$ and ≥20% $W_{RR}$. Still further, $W_G$ can be ≤40% $W_{RR}$ and ≥5% $W_{RR}$, such as ≤40% $W_{RR}$ and ≥10% $W_{RR}$, or ≤40% $W_{RR}$ and ≥20% $W_{RR}$.

As described herein, each the recessed region 156, 158 is a portion of the abrasive article indicia 120, 122. Moreover, the intra-segment gullet 132 can be at least partially and integrally formed with the abrasive article indicia 120, 122. In a particular aspect, as illustrated, the intra-segment gullet 132 can have a rectangular portion and a rounded end. The rectangular portion can have a substantially uniform width that is equal to $W_G$.

FIG. 11 illustrates another abrasive article designated 1100. As depicted, the abrasive article 1100 can include a core 1102. A plurality of segments 1104 can extend outwardly from a perimeter, or circumference, of the core 1102. The segments 1104 can be formed separately from the core, as described herein, and affixed to the core via a brazing procedure, a welding procedure, a mechanical coupling, etc. In a particular aspect, each adjacent pair of segments 1104 can be separated by a gap, such as an inter-segment gullet 1106.

Each inter-segment gullet 1106 can include a first portion 1108 that extends from the outer periphery, or circumference, of the adjacent segments 1104 inward at an angle with respect to a line passing through a center 1110 of the core 1110 and the center of the base of the first portion 1108 of the inter-segment gullet 1106 at the outer perimeter of the core 1102. As illustrated, the center 1110 of the core 1102 is also the center of the abrasive article 1100. The first portion 1108 of the inter-segment gullet 1106 can extend to a second portion 1112 of the inter-segment gullet 1106 that extends into the core 1102. The second portion 1112 can extend from an outer periphery of the core 1102 into the core 1102 at a second angle in a direction that is opposite the first portion 1108 of the inter-segment gullet 1106. The second portion 1112 of the inter-segment gullet 1106 can extend to a third portion 1114 of the inter-segment gullet 1106 that extends further into the core 1102. The third portion 1114 can extend from the second portion 1112 at a third angle in a direction that is opposite the second portion 1112 of the inter-segment gullet 1106 and in the same general direction as the first portion 1108 of the inter-segment gullet 1106. The third portion 1112 of the inter-segment gullet 1106 can terminate in a generally circular end 1116. The circular end 1116 can be a bore formed through core 1102. Moreover, the circular end 1116 can lie substantially along the line passing through the center 1110 of the core 1102 and the center of the base of the first portion 1108 of the inter-segment gullet 1106 at the outer perimeter of the core 1102. In particular, a center of the circular end 1116 can lie along that line.

The first portion 1108 of the inter-segment gullet 1106 can include an open space between two adjacent segments 1104 that is defined by a leading end 1118 of a first segment in the pair of segments and a trailing end 1120 of a second segment in the pair of segments 1104. The second portion 1112 and the third portion 1114 of the inter-segment gullet 1106 can include a slot cut into the core 1102.

In a particular aspect, the first portion 1108 of the inter-segment gullet 1106 can have a first width and the second portion 1112 and third portion 1114 of each inter-segment gullet 1106 can include a second width. The first width can be greater than the second width. The end 1116 of the inter-segment gullet 1106 can have a diameter and the diameter can be greater than the first width.

In a particular aspect, as illustrated in FIG. 11 and FIG. 2, the segments 1104 are all identical to each other and can be arranged on the core 1102 to form a first abrasive article indicia 1122 around the outer periphery of the core 1102 on a first side of the abrasive article 1100 and a second abrasive article indicia 1124 around the outer periphery of the core 1102 on a second side of the abrasive article 1100 opposite the first side. For example, the segments 1104 and the abrasive article indicia 1122, 1124 can be arranged in a ring around the core 1102.

As most clearly illustrated in FIG. 14 and FIG. 15, each abrasive segment 1104 can include a segment body 1130. The segment body 1130 can be curved. In other aspects, the segment body 1130 can be generally rectangular.

In a particular aspect, the segment body 1130 can further include a first radial sidewall 1140 at the leading end 1118 of the segment 1104. The first radial sidewall 1140 can extend between the inner and outer circumferential walls 1134, 1136. The segment body 1130 can also include a second radial sidewall 1142 at the trailing end 1120 of the segment 1104. The second radial sidewall 1142 can extend between the inner and outer circumferential walls 1134, 1136 opposite the first radial sidewall 1140. Each radial sidewall 1140, 1142 can also be considered a gullet wall as they flank the first portion 1108 of the inter-segment gullet 1106 formed between two adjacent segments 1104.

A first face 1144 can extend between the inner and outer circumferential walls 1134, 1136 and the radial sidewalls 1140, 1142. Further, a second face 1146 can extend between the inner and outer circumferential walls 1134, 1136 and the radial sidewalls 1140, 1142 opposite the first face 1144.

As depicted, the segment 1104 can include segment indicia 1150, 1152 formed in the faces 1144, 1146 of the segment body 1130. The segment indicia 1150, 1152 can include a recessed region 1154 that can extend into the first face 1144, the second face 1146, or both the first and second faces 1144, 1146. In particular, the recessed region 1154 can be a bilateral recessed region 1154 that can include a first recessed region 1156 extending into the first face 1144 and a second recessed region 1158 extending into the second face 1146 opposite the first recessed region 1156. The first and second recessed regions 1156, 1158 can be mirror opposites of each other. As illustrated, each recessed region 1156, 1158 can include a gullet portion 1160, 1162 that can extend at least partially along the gullet walls 1140, 1142 that flank the first portion 1108 of the inter-segment gullet 1106 established between two segments 1104 (FIG. 11 and FIG. 12).

In a particular aspect, each sidewall 1140, 1142, i.e., each gullet wall 1140, 1142, can include a length, $L_{GW}$, measured along each side of the first portion 1108 of the inter-segment gullet 106. The gullet portion 1160, 1162 of each recessed region 1156, 1158 can extend along a length, $L_{GP}$, comprising a portion of $L_{GW}$, and $L_{GP}<L_{GW}$. For example, $L_{GP}$ can be ≤95% $L_{GW}$, such as ≤90% $L_{GW}$, ≤85% $L_{GW}$, ≤80% $L_{GW}$, ≤75% $L_{GW}$, or ≤70% $L_{GW}$. Moreover, $L_{GP}$ can be ≥25% $L_{GW}$, such as ≥30% $L_{GW}$, ≥35% $L_{GW}$, or ≥40% $L_{GW}$. In a further aspect, $L_{GP}$ can be within a range between and including any of the maximum and minimum values of $L_{GP}$ described herein.

For example, $L_{GP}$ can be ≤90% $L_{GW}$ and ≥25% $L_{GW}$, such as ≤90% $L_{GW}$ and ≥30% $L_{GW}$, ≤90% $L_{GW}$ and ≥35% $L_{GW}$, or ≤90% $L_{GW}$ and ≥40% $L_{GW}$. Further, $L_{GP}$ can be ≤85% $L_{GW}$ and ≥25% $L_{GW}$, such as ≤85% $L_{GW}$ and ≥30% $L_{GW}$, ≤85% $L_{GW}$ and ≥35% $L_{GW}$, or ≤85% $L_{GW}$ and ≥40% $L_{GW}$. $L_{GP}$ can be ≤80% $L_{GW}$ and ≥25% $L_{GW}$, such as ≤80% $L_{GW}$ and ≥30% $L_{GW}$, ≤80% $L_{GW}$ and ≥35% $L_{GW}$, or ≤80% $L_{GW}$ and ≥40% $L_{GW}$. Still further, $L_{GP}$ can be ≤75% $L_{GW}$ and ≥25% $L_{GW}$, such as ≤75% $L_{GW}$ and ≥30% $L_{GW}$, ≤75% $L_{GW}$ and ≥35% $L_{GW}$, or ≤75% $L_{GW}$ and ≥40% $L_{GW}$. Moreover, $L_{GP}$ can be ≤70% $L_{GW}$ and ≥25% $L_{GW}$, such as ≤70% $L_{GW}$ and ≥30% $L_{GW}$, ≤70% $L_{GW}$ and ≥35% $L_{GW}$, or ≤70% $L_{GW}$ and ≥40% $L_{GW}$.

As illustrated in FIG. 16 and FIG. 17, the segment body 1130 can include a first thickness, $T_1$, measured between the first face 1144 and the second face 1146 of the segment body 1130, e.g., at each sidewall 1140, 1142, aka each gullet wall 1140, 1142. Further, the segment body 1130 can include a second thickness, $T_2$, measured at the first recessed portion 1150 and the second recessed region 1158, e.g., at each gullet wall 1140, 1142. In a particular aspect, $T_2$ can be $<T_1$. For example, $T_2$ can be ≤80% $T_1$, such ≤75% $T_1$, ≤70% $T_1$, or ≤65% $T_1$. Moreover, $T_2$ can be ≥40% $T_1$, such as ≥45% $T_1$, ≥50% $T_1$, ≥55% $T_1$, or ≥60% $T_1$. In another aspect, $T_2$ can be within a range between and including any of the maximum and minimum values of $T_2$ described herein.

For example, $T_2$ can be ≤80% $T_1$ and ≥40% $T_1$, such as ≤80% $T_1$ and ≥45% $T_1$, ≤80% $T_1$ and ≥50% $T_1$, ≤80% $T_1$ and ≥55% $T_1$, or ≤80% $T_1$ and ≥60% $T_1$. In another aspect, $T_2$ can be ≤75% $T_1$ and ≥40% $T_1$, such as ≤75% $T_1$ and ≥45% $T_1$, ≤75% $T_1$ and ≥50% $T_1$, ≤75% $T_1$ and ≥55% $T_1$, or ≤75% $T_1$ and ≥60% $T_1$. Further, $T_2$ can be ≤70% $T_1$ and ≥40% $T_1$, such as ≤70% $T_1$ and ≥45% $T_1$, ≤70% $T_1$ and ≥50% $T_1$, ≤70% $T_1$ and ≥55% $T_1$, or ≤70% $T_1$ and ≥60% $T_1$. Still further, $T_2$ can be ≤65% $T_1$ and ≥40% $T_1$, such as ≤65% $T_1$ and ≥45% $T_1$, ≤65% $T_1$ and ≥50% $T_1$, ≤65% $T_1$ and ≥55% $T_1$, or ≤65% $T_1$ and ≥60% $T_1$.

Accordingly, each gullet wall 1140, 1142 can have a first width, $W_1$, and a second width, $W_2$, and $W_2$ can be $<W_1$. For example, $W_2$ can be ≤80% $W_1$, such ≤75% $W_1$, ≤70% $W_1$, or ≤65% $W_1$. Moreover, $W_2$ can be ≥40% $W_1$, such as ≥45% $W_1$, ≥50% $W_1$, ≥55% $W_1$, or ≥60% $W_1$. In another aspect, $W_2$ can be within a range between and including any of the maximum and minimum values of $W_2$ described herein.

For example, $W_2$ can be ≤80% $W_1$ and ≥40% $W_1$, such as ≤80% $W_1$ and ≥45% $W_1$, ≤80% $W_1$ and ≥50% $W_1$, ≤80% $W_1$ and ≥55% $W_1$, or ≤80% $W_1$ and ≥60% $W_1$. In another aspect, $W_2$ can be $\leq 75\%\ W_1$ and $\geq 40\%\ W_1$, such as $\leq 75\%\ W_1$ and $\geq 45\%\ W_1$, $\leq 75\%\ W_1$ and $\geq 50\%\ W_1$, $\leq 75\%\ W_1$ and $\geq 55\%\ W_1$, or $\leq 75\%\ W_1$ and $\geq 60\%\ W_1$. Further, $W_2$ can be $\leq 70\%\ W_1$ and $\geq 40\%\ W_1$, such as $\leq 70\%\ W_1$ and $\geq 45\%\ W_1$, $\leq 70\%\ W_1$ and $\geq 50\%\ W_1$, $\leq 70\%\ W_1$ and $\geq 55\%\ W_1$, or $\leq 70\%\ W_1$ and $\geq 60\%\ W_1$. Still further, $W_2$ can be $\leq 65\%\ W_1$ and $\geq 40\%\ W_1$, such as $\leq 65\%\ W_1$ and $\geq 45\%\ W_1$, $\leq 65\%\ W_1$ and $\geq 50\%\ W_1$, $\leq 65\%\ W_1$ and $\geq 55\%\ W_1$, or $\leq 65\%\ W_1$ and $\geq 60\%\ W_1$.

In another aspect, the first face 1144 and the second face 1146 of the segment body 1130 can include a first surface roughness, $R_1$. The face of first recessed region 1156 and the face of the second recessed region 1158 can include a second surface roughness, $R_2$. In this aspect, $R_2$ can be $<R_1$. For example, $R_2$ can be $\leq 50\%\ R_1$, such $\leq 45\%\ R_1$, $\leq 40\%\ R_1$, or $\leq 35\%\ T_1$. Moreover, $R_2$ can be $\geq 1\%\ R_1$, such as $\geq 2.5\%\ R_1$ or $\geq 5\%\ R_1$. In addition, $R_2$ can be within a range between and including any of the maximum and minimum values of $R_2$ described herein.

For example, $R_2$ can be $\leq 50\%\ R_1$ and $\geq 1\%\ R_1$, such as $\leq 50\%\ R_1$ and $\geq 2.5\%\ R_1$ or $\leq 50\%\ R_1$ and $\geq 5\%\ R_1$. Further, $R_2$ can be $\leq 45\%\ R_1$ and $\geq 1\%\ R_1$, such as $\leq 45\%\ R_1$ and $\geq 2.5\%\ R_1$ or $\leq 45\%\ R_1$ and $\geq 5\%\ R_1$. $R_2$ can be $\leq 40\%\ R_1$ and $\geq 1\%\ R_1$, such as $\leq 40\%\ R_1$ and $\geq 2.5\%\ R_1$ or $\leq 40\%\ R_1$ and $\geq 5\%\ R_1$. Still further, $R_2$ can be $\leq 35\%\ R_1$ and $\geq 1\%\ R_1$, such as $\leq 35\%\ R_1$ and $\geq 2.5\%\ R_1$ or $\leq 35\%\ R_1$ and $\geq 5\%\ R_1$.

In yet another aspect, the segment 1104, or segment body 1130, can include a circumferential length, $L_S$, measured from the first radial sidewall 1140 to the second radial sidewall 1142 along the outer circumferential wall 1136. The first portion 1108 of each inter-segment gullet 1106 can include a circumferential width, $W_G$, and in this aspect, $W_G$ can be $<L_S$. For example, $W_G$ can be $\leq 20\%\ L_S$, such $\leq 15\%\ L_S$, or $\leq 10\%\ L_S$. Also, $W_G$ can be $\geq 2.5\%\ L_S$, such as $\geq 5\%\ L_S$ or $\geq 7.5\%\ L_S$. $W_G$ can be substantially uniform along a length of the first portion 1108 of the inter-segment gullet.

Additionally, $W_G$ can be within a range between and including any of the maximum and minimum values of $W_G$ described herein. For example, $W_G$ can be $\leq 20\%\ L_S$ and $\geq 2.5\%\ L_S$, such as $\leq 20\%\ L_S$ and $\geq 5\%\ L_S$ or $\leq 20\%\ L_S$ and $\geq 7.5\%\ L_S$. Further, $W_G$ can be $\leq 15\%\ L_S$ and $\geq 2.5\%\ L_S$, such as $\leq 15\%\ L_S$ and $\geq 5\%\ L_S$ or $\leq 15\%\ L_S$ and $\geq 7.5\%\ L_S$. Further still, $W_G$ can be $\leq 10\%\ L_S$ and $\geq 2.5\%\ L_S$, such as $\leq 10\%\ L_S$ and $\geq 5\%\ L_S$ or $\leq 10\%\ L_S$ and $\geq 7.5\%\ L_S$.

In another aspect, the gullet portion 1160, 1162 of each recessed region 1156, 1158 can include an overall width, $W_{RR}$, measured along the perpendicular axis or an axis parallel to the perpendicular axis, and $W_G$ can be $<W_{RR}$. For example, $W_G$ can be $\leq 50\%\ W_{RR}$, such $\leq 45\%\ W_{RR}$, or $\leq 30\%\ W_{RR}$. Further, $W_G$ can be $\geq 5\%\ W_{RR}$, such as $\geq 10\%\ W_{RR}$ or $\geq 20\%\ W_{RR}$. In another aspect, $W_G$ can be within a range between and including any of the maximum and minimum values of $W_G$ described herein.

For example, $W_G$ can be $\leq 50\%\ W_{RR}$ and $\geq 5\%\ W_{RR}$, such as $\leq 50\%\ W_{RR}$ and $\geq 10\%\ W_{RR}$, or $\leq 50\%\ W_{RR}$ and $\geq 20\%\ W_{RR}$. Further, $W_G$ can be $\leq 45\%\ W_{RR}$ and $\geq 5\%\ W_{RR}$, such as $\leq 45\%\ W_{RR}$ and $\geq 10\%\ W_{RR}$, or $\leq 45\%\ W_{RR}$ and $\geq 20\%\ W_{RR}$. Still further, $W_G$ can be $\leq 40\%\ W_{RR}$ and $\geq 5\%\ W_{RR}$, such as $\leq 40\%\ W_{RR}$ and $\geq 10\%\ W_{RR}$, or $\leq 40\%\ W_{RR}$ and $\geq 20\%\ W_{RR}$.

As described herein, each recessed region 1156, 1158 is a portion of the abrasive article indicia 1120, 1122 and the first portion 1108 of the inter-segment gullet 106 flanked by the segment 1104 can be at least partially and integrally formed with the abrasive article indicia 1120, 1122.

In each of the embodiments described herein, the recessed regions 154, 1154 can be formed by pressing a portion of the material of the segment 104, 1104 into the segment 104, 1104 away from the faces 144, 146, 1144, 1146. This pressing operation can be performed during a molding process. The molding process can include pressing a green segment using a hot pressing operation, a cold pressing operation, or some other pressing operation.

Further, the first recessed region 156, 1156 of each segment 104, 1104 can include a substantially uniform first depth, $D_1$, that is measured perpendicularly into the segment 104, 1104 from the first face 144, 1144 of the segment 104, 1104. In one aspect, $D_1$ can be $\geq 5\%$ of the segment thickness, T, measured from the first face 144, 1144 to the second face 146, 1146. For example, $D_1$ can be $\geq 10\%$ T, or $\geq 15\%$ T. In another aspect, $D_1$ can be $\leq 30\%$ T, such as $\leq 25\%$ T, or $\leq 20\%$ T. Further, $D_1$ can be within a range between and including any of the % of T values above.

For example, $D_1$ can be $\geq 5\%$ T and $\leq 30\%$ T, such as $\geq 5\%$ T and $\leq 25\%$ T, or $\geq 5\%$ T and $\leq 20\%$ T. Further, $D_1$ can be $\geq 10\%$ T and $\leq 30\%$ T, such as $\geq 10\%$ T and $\leq 25\%$ T, or $\geq 10\%$ T and $\leq 20\%$ T. Additionally, $D_1$ can be $\geq 15\%$ T and $\leq 30\%$ T, such as $\geq 15\%$ T and $\leq 25\%$ T, or $\geq 15\%$ T and $\leq 20\%$ T.

Similarly, the second recessed region 158, 1158 of each segment 104 can includes a substantially uniform second depth, $D_2$, that is measured perpendicularly into the segment 104, 1104 from the second face 146, 1146 of the segment 104, 1104. In one aspect, $D_2$ can be $\geq 5\%$ T, such as $\geq 10\%$ T, or $\geq 15\%$ T. In another aspect, $D_2$ can be $\leq 30\%$ T, such as $\leq 25\%$ T, or $\leq 20\%$ T. Further, $D_2$ can be within a range between and including any of the % of T values above.

For example, $D_2$ can be $\geq 5\%$ T and $\leq 30\%$ T, such as $\geq 5\%$ T and $\leq 25\%$ T, or $\geq 5\%$ T and $\leq 20\%$ T. Further, $D_2$ can be $\geq 10\%$ T and $\leq 30\%$ T, such as $\geq 10\%$ T and $\leq 25\%$ T, or $\geq 10\%$ T and $\leq 20\%$ T. Additionally, $D_2$ can be $\geq 15\%$ T and $\leq 30\%$ T, such as $\geq 15\%$ T and $\leq 25\%$ T, or $\geq 15\%$ T and $\leq 20\%$ T.

In another aspect, $D_1$ can be essentially equal to $D_2$. For example, $D_1$ can be $=D_2 \pm 5\%\ D_2$, such as $D_2 \pm 4\%\ D_2$, $D_2 \pm 3\%\ D_2$, $D_2 \pm 2\%\ D_2$, or $D_2 \pm 1\%\ D_2$. In another aspect, $D_1 = D_2$.

In another aspect, the recessed regions 154, 1154 can be established by removing material from the first face 144, 1144 and the second face 146, 1146 of each segment 104, 1104. In such an aspect, the material removed from each first face 144, 1144 and each second face 146, 1146 of each segment 104, 1104 should be substantially the same in order to maintain balance and prevent vibration of the abrasive article 100, 1100 during use. If $D_1 = D_2$, the same volume of material can be removed from each face 144, 146, 1144, 1146, or compressed, by removing or compressing material over the same total area of each face 144, 146, 1144, 1146.

Accordingly, the first face 144, 1146 of each segment 104, 1104 can include an overall surface area, $A_{F1}$, before each respective first recessed region 156, 1156 is formed therein. After the first recessed region 156, 1156 is formed, the first recessed region 156, 1156 can include a first recessed region surface area, $A_{RR1}$. Similarly, the second face 146, 1146 of each segment 104, 1104 can include an overall surface area, $A_{F2}$, before each respective second recessed region 158, 1158 is formed therein. After the second recessed region 156, 1156 is formed, the second recessed region 156, 1156 can have a second recessed region surface area $A_{RR2}$.

In a particular aspect, $A_{RR1}$ can be $\leq 45\%\ A_{F1}$, such as $\leq 40\%\ A_{F1}$, or $\leq 35\%\ A_{F1}$. Further, $A_{RR1}$ can be $\geq 2\%\ A_{F1}$, such as $\geq 5\%\ A_{F1}$, $\geq 10\%\ A_{F1}$, or $\geq 15\%\ A_{F1}$. $A_{RR1}$ can be in a range between and including any of the maximum and minim area values described above.

For example, $A_{RR1}$ can be $\leq 45\%\ A_{F1}$ and $\geq 2\%\ A_{F1}$, such as $\leq 45\%\ A_{F1}$ and $\geq 5\%\ A_{F1}$, $\leq 45\%\ A_{F1}$ and $\geq 10\%\ A_{F1}$, or $\leq 45\%\ A_{F1}$ and $\geq 15\%\ A_{F1}$. Further, $A_{RR1}$ can be $\leq 40\%\ A_{F1}$ and $\geq 2\%\ A_{F1}$, such as $\leq 40\%\ A_{F1}$ and $\geq 5\%\ A_{F1}$, $\leq 40\%\ A_{F1}$ and $\geq 10\%\ A_{F1}$, or $\leq 40\%\ A_{F1}$ and $\geq 15\%\ A_{F1}$. Still further, $A_{RR1}$ can be ≤35% $A_{F1}$ and ≥2% $A_{F1}$, such as ≤35% $A_{F1}$ and ≥5% $A_{F1}$, ≤35% $A_{F1}$ and ≥10% $A_{F1}$, or ≤35% $A_{F1}$ and ≥15% $A_{F1}$.

Similarly, $A_{RR2}$ can be ≤45% $A_{F2}$, such as ≤40% $A_{F2}$, or ≤35% $A_{F2}$. Moreover, $A_{RR2}$ can be ≥2% $A_{F2}$, such as ≥5% $A_{F2}$, ≥10% $A_{F2}$, or ≥15% $A_{F2}$. $A_{RR2}$ can be in a range between and including any of the maximum and minimum area values described above.

For example, $A_{RR2}$ can be ≤45% $A_{F2}$ and ≥2% $A_{F2}$, such as ≤45% $A_{F2}$ and ≥5% $A_{F2}$, ≤45% $A_{F2}$ and ≥10% $A_{F2}$, or ≤45% $A_{F2}$ and ≥15% $A_{F2}$. Further, $A_{RR2}$ can be ≤40% $A_{F2}$ and ≥2% $A_{F2}$, such as ≤40% $A_{F2}$ and ≥5% $A_{F2}$, ≤40% $A_{F2}$ and ≥10% $A_{F2}$, or ≤40% $A_{F2}$ and ≥15% $A_{F2}$. Still further, $A_{RR2}$ can be ≤35% $A_{F2}$ and ≥2% $A_{F2}$, such as ≤35% $A_{F2}$ and ≥5% $A_{F2}$, ≤35% $A_{F2}$ and ≥10% $A_{F2}$, or ≤35% $A_{F2}$ and ≥15% $A_{F2}$.

In a particular aspect, each segment indicia 150, 152, 1150, 1152 and/or each abrasive article indicia 122, 124, 1122, 1124 can include a company name, a product name, a product identifier, a company logo, a product logo, a design, or a combination thereof. Further, the shape of the indicia, the surface finish of the indicia, the location of the indicia adjacent to a gullet (or gullet wall), can increase the ability of the abrasive article 100, 1100 to remove swarf during use and move cutting fluid, or cooling fluid, through the workpiece during use. Moreover, the shape of the indicia, the surface finish of the indicia, the location of the indicia adjacent to a gullet (or gullet wall), can increase a volume of cutting fluid or cooling fluid moving through the workpiece during use of the abrasive article. In particular, the gullet portion 160, 162, 1160, 1162 can form a pocket adjacent to, or at least partially around, an intra-segment gullet 132 or an inter-segment gullet 108. The pocket formed by the gullet portion 160, 162, 1160, 1162 of each recessed region 156, 158, 1156, 1158 can facilitate the movement of cooling fluid into and out of the workpiece and the removal of swarf from the cutting area during a cutting operation.

In particular, when compared to a commercially available abrasive article that includes standard segments not formed with shaped gullet walls, as described herein, each abrasive article 100, 1100 formed with shaped gullet walls, as described herein, can move a volume of fluid, $V_{SGW}$, that is greater than a volume of fluid, $V_{CA}$, moved by the commercially available abrasive article under the same operating conditions. For example, these operating conditions can include: a workpiece type, a workpiece thickness, an angular speed of the abrasive article (RMP), a linear feed rate of the abrasive article into the workpiece, a fluid type, a fluid temperature, and a working temperature.

$V_{SGW}$ can be ≥105% $V_{CA}$, such as ≥110% $V_{CA}$, or ≥115% $V_{CA}$. Moreover, $V_{SGW}$ can be ≤300% $V_{CA}$, such as ≤200% $V_{CA}$, or ≤150% $V_{CA}$. Further, $V_{SGW}$ can be within a range between and including any of the maximum and minimum values of $V_{SGW}$ described herein.

For example, $V_{SGW}$ can be ≥105% $V_{CA}$ and ≤300% $V_{CA}$, such as ≥105% $V_{CA}$ and ≤200% $V_{CA}$, or ≥105% $V_{CA}$ and ≤150% $V_{CA}$. Further, $V_{SGW}$ can be ≥110% $V_{CA}$ and ≤300% $V_{CA}$, such as ≥110% $V_{CA}$ and ≤200% $V_{CA}$, or ≥110% $V_{CA}$ and ≤150% $V_{CA}$. Further still, $V_{SGW}$ can be ≥115% $V_{CA}$ and ≤300% $V_{CA}$, such as ≥115% $V_{CA}$ and ≤200% $V_{CA}$, or ≥115% $V_{CA}$ and ≤150% $V_{CA}$.

In a particular aspect, the core 102, 1102 of each abrasive article 100, 1100 described herein can be in the form of a ring, a ring section, a plate, or a disc depending upon the intended application of the abrasive article. The core 102, 1102 can be made of a metal or metal alloy. For instance, the core 102, 1102 can be made of steel, and particularly, a heat treatable steel alloys, such as 25CrMo4, 75Cr1, C60, or similar steel alloys for a core having a thin cross section or simple construction steel like St 60 or similar for a thick core. The core 102, 1102 can have a tensile strength of at least about 600 N/mm². The core can be formed by a variety of metallurgical techniques known in the art.

In an exemplary embodiment, an abrasive segment 104, 1104 can include abrasive particles embedded in a bond matrix. The bond matrix can include a metal matrix having a network of interconnected pores. The abrasive particles can include an abrasive material having a Mohs hardness of at least about 7. In particular instances, the abrasive particles can include a superabrasive material, such as diamond or cubic boron nitride. The abrasive particles can have a particle size of not less than about 400 US mesh, such as not less than about 100 US mesh, such as between about 25 and 80 US mesh. Depending on the application, the size can be between about 30 and 60 US mesh.

The abrasive particles can be present in an amount between about 2 vol % to about 50 vol %. Additionally, the amount of abrasive particles may depend on the application. For example, an abrasive segment for a grinding or polishing tool can include between about 3.75 and about 50 vol % abrasive particles of the total volume of the abrasive segment. Alternatively, an abrasive segment for a cutting-off tool can include between about 2 vol % and about 6.25 vol % abrasive particles of the total volume of the abrasive segment. Further, an abrasive segment for core drilling can include between about 6.25 vol % and about 20 vol % abrasive particles of the total volume of the abrasive segment.

The metal matrix can include a metal element or metal alloy including a plurality of metal elements. For certain abrasive segments, the metal matrix can include metal elements such as iron, tungsten, cobalt, nickel, chromium, titanium, silver, and a combination thereof. In particular instances, the metal matrix can include a rare earth element such as cerium, lanthanum, neodymium, and a combination thereof.

In one particular example, the metal matrix can include a wear resistant component. For example, in one embodiment, the metal matrix can include tungsten carbide, and more particularly, may consist essentially of tungsten carbide.

In certain designs, the metal matrix can include particles of individual components or pre-alloyed particles. The particles can be between about 1.0 microns and about 250 microns.

In a particular aspect, the abrasive segment 104, 1104 can be formed such that an infiltrant is present within the interconnected network of pores within the body 130 1130 of the abrasive segment 104, 1104. The infiltrant can partially fill, substantially fill, or even completely fill the volume of the pores extending through the volume of the abrasive segment 104, 1104. In accordance with one particular design, the infiltrant can be a metal or metal alloy material. For example, some suitable metal elements can include copper, tin, zinc, and a combination thereof.

In particular instances, the infiltrant can be a bronzing material made of a metal alloy, and particular a copper-tin metal alloy, such that it is particularly suited for welding according to embodiments herein. For example, the bronzing material can consist essentially of copper and tin. Certain bronzing materials can incorporate particular contents of tin greater than about 5% by weight, such as greater than about 6% by weight, greater than about 7% by weight, or even greater than about 8% by weight. Further, certain bronzing materials can incorporate particular contents of tin less than about 20% by weight, such as less than about 15% by weight, less than about 12% by weight, or even less than about 10% by weight of the total amount of materials within the composition.

In accordance with an embodiment, the bronzing material can include an amount of tin within a range between and including about 5% by weight and about 20% by weight, such as between and including about 5% by weight and about 15% by weight, between and including about 5% by weight and about 12% by weight, or between and including about 5% by weight and about 10% by weight.

In another embodiment, the bronzing material can include an amount of tin within a range between and including about 6% by weight and about 20% by weight, such as between and including about 6% by weight and about 15% by weight, between and including about 6% by weight and about 12% by weight, or between and including about 6% by weight and about 10% by weight.

Further, in yet another embodiment, the bronzing material can include an amount of tin within a range between and including about 7% by weight and about 20% by weight, such as between and including about 7% by weight and about 15% by weight, between and including about 7% by weight and about 12% by weight, or between and including about 7% by weight and about 10% by weight.

Still further, in accordance with another embodiment, the bronzing material can include an amount of tin within a range between and including about 8% by weight and about 20% by weight, such as between and including about 8% by weight and about 15% by weight, between and including about 8% by weight and about 12% by weight, or between and including about 8% by weight and about 10% by weight.

Moreover, certain bronzing materials can be used as infiltrant material, and can have an amount of copper of at least about 80%, at least about 85%, or even at least about 88% by weight of the total amount of materials within the composition. Some bronzing materials can utilize an amount of copper within a range between about 80% and about 95%, such as between about 85% and about 95%, or even between about 88% and about 93% by weight of the total amount of materials within the composition.

Additionally, the bronzing material may contain a particularly low content of other elements, such as zinc to facilitate proper formation of the abrasive article according to the forming methods of the embodiments herein. For example, the bronzing material may utilize not greater than about 10%, such as not greater than about 5%, or even not greater than about 2% zinc. In fact, certain bronzing materials can be essentially free of zinc.

The abrasive segment 104, 1104 may be manufactured, such that abrasive particles can be combined with a metal matrix to form a mixture. The metal matrix can include a blend of particles of the components of the metal matrix or can be pre-alloyed particles of the metal matrix. In an embodiment, the metal matrix can conform to the formula $(WC)_w W_x Fe_y Cr_z X_{(1-w-x-y-z)}$, wherein $0 \leq w \leq 0.8$, $0 \leq x \leq 0.7$, $0 \leq y \leq 0.8$, $0 \leq z \leq 0.05$, $w+x+y+z \leq 1$, and X can include other metals such as cobalt and nickel. In another embodiment, the metal matrix can conform to the formula $(WC)_w W_x Fe_y Cr_z Ag_v X_{(1-v-w-x-y-z)}$, wherein $0 \leq w \leq 0.5$, $0 \leq x \leq 0.4$, $0 \leq y \leq 1.0$, $0 \leq z \leq 0.05$, $0 \leq v \leq 0.1$, $v+w+x+y+z \leq 1$, and X can include other metals such as cobalt and nickel.

The mixture of metal matrix and abrasive particles can be formed into an abrasive preform by a pressing operation, particularly a cold pressing operation, to form a porous abrasive segment. The cold pressing can be carried out at a pressure within a range between and including about 50 kN/cm$^2$ (500 MPa) to about 250 kN/cm$^2$ (2500 MPa). The resulting porous abrasive segment can have a network of interconnected pores. In an example, the porous abrasive segment can have a porosity between about 25 and 50 vol %.

The resulting porous abrasive segment 104, 1104 can then be subject to an infiltration process, wherein the infiltrant material is disposed within the body of the abrasive segment, and particularly, disposed within the interconnected network of pores within the body of the abrasive segment. The infiltrant may be drawn into the pores of the cold pressed abrasive segment via capillary action. After the infiltration process, the resulting densified abrasive segment can be not less than about 96% dense. The amount of infiltrant that infiltrates the abrasive segment can be between about 20 wt % and 45 wt % of the densified abrasive segment.

The abrasive segment 104, 1104 can include a backing region, disposed between the abrasive segment and the base, i.e., the core 102, 1102, which facilitates the joining of the abrasive segment and the core 102, 1102. According to one embodiment, the backing region can be a distinct region from the abrasive segment 104, 1104 and the core 102, 1102. Still, the backing region can be initially formed as part of the abrasive segment 104, 1104, and particularly may be a distinct region of the abrasive segment 104, 1104 along the inner circumferential wall 134, 1134 that has particular characteristics facilitating the joining of the abrasive segment 104, 1104 and the core 102, 1102. For example, according to one embodiment, the backing region can have a lesser percentage (vol %) of abrasive particles as compared to the amount of abrasive particles within the abrasive segment 104, 1104. In fact, in certain instances, the backing region can be essentially free of abrasive particles. This may be particularly suitable for forming methods utilizing a beam of energy (e.g., a laser) used to weld the abrasive segment 104, 1104 to the core 102, 1102.

At least a portion of the backing region can include a bonding composition. The bonding composition can include a metal or metal alloy. Some suitable metal materials can include transition metal elements, including for example, titanium, silver, manganese, phosphorus, aluminum, magnesium, chromium, iron, lead, copper, tin, and a combination thereof.

In particular instances, the bonding composition can be similar to the infiltrant, such that the bonding composition and the infiltrant are different from each other by not greater than a single elemental species. In even more particular instances, the bonding composition can be the same as the infiltrant. According to embodiments herein, the bonding composition can be related to the infiltrant composition in having a certain degree of commonality of elemental species. Quantitatively, an elemental weight percent difference between the bonding composition and the infiltrant composition does not exceed 20 weight percent. Elemental weight percent difference is defined as the absolute value of the difference in weight content of each element contained in the bonding composition relative to the infiltrant composition. Other embodiments have closer compositional relationships between the bonding composition and the composition of the infiltrant. The elemental weight percent difference between the bonding composition and the infiltrant composition may, for example, not exceed 15 weight percent, 10 weight percent, 5 weight percent, or may not exceed 2 weight percent. An elemental weight percent difference of about zero represents the same composition making up the backing region and the infiltrant. The foregoing elemental values may be measured by any suitable analytical means, including microprobe elemental analysis, and ignores alloying that might take place along areas in which the infiltrant contacts the metal matrix.

The backing region can include at least about 90 wt % infiltrant, such as at least about 95 wt % infiltrant, such as at least about 98 wt % infiltrant. The infiltrant can be continuous throughout the backing region and the densified abrasive segment. In certain instances, the backing region can be formed primarily of the infiltrant material, and in more particular instances, can consist essentially of the infiltrant material. Still, in other embodiments, the backing region can be an infiltrated region, like the abrasive segment. Accordingly, the backing region can include a network of interconnected pores formed between a matrix metal, and wherein the infiltrant material substantially fills the interconnected pores. The backing region can contain similar amounts of matrix metal and infiltrant. Notably, the backing region may be essentially free of abrasive particles. In such embodiments wherein the backing region includes interconnected pores substantially filled with the infiltrant, the infiltrant material can act as a bronzing material in forming a joint (e.g., a welded joint) between the base and the abrasive segment.

In one embodiment, the backing region can be formed of the bronzing material described herein. In fact, certain backing regions can consist essentially of a copper-tin bronzing material having about 88% copper and 12% tin or 90% copper and 10% tin.

In general, an abrasive article 100, 1100 as described herein can be made by forming a plurality of segments 104, 1104. Each of the plurality of segments 104, 1104 can include first segment indicia 150, 1150 on a first face 144, 1144 and second segment indicia 152, 1152 on a second face 146, 1146 that is opposite the first face 144, 1144. While each of the plurality of segments 104, 1104 on the respective abrasive article 100, 1100 can be identically constructed, the first segment indicia 150, 1150 on a single segment 104, 1104 can be mirror opposites of the second segment indicia 152, 1152 on the segment 104, 1104. The segments 104, 1104 can be configured to establish first abrasive article indicia 122, 1122 on a first side of the abrasive article 100, 1100 and second abrasive article indicia 124, 1124 on a second side of the abrasive article 100, 1100 opposite the first side.

The first abrasive article indicia 122, 1122 formed on each abrasive article 100, 1100 can include a repeating pattern of the first segment indicia 150, 1150 and the second abrasive article indicia 124, 1124 can include a repeating pattern of the second segment indicia 152, 1152. The shape of the abrasive article indicia 122, 1122, 124, 1124, i.e., the shape of the abrasive article indicia 122, 1122, 124, 1124 at the gullet walls 138, 1140, 1142, can serve to pump cutting fluid into and out of a cutting area as the abrasive article rotates. This pumping action can aid in cooling the cutting area and cleaning the cutting area of swarf or debris. In addition, the abrasive article indicia can serve as an identifier of the abrasive article, the manufacturer of the abrasive article, etc.

The method of making the abrasive article 100, 1100 can include affixing the segments 104, 1104 to the core 102, 1102 such that the first segment indicia 150, 1150 of each segment 104, 1104 is facing a first direction and the second segment indicia 152, 1152 of each segment 104, 1104 is facing a second direction opposite the first direction. Affixing the segments 104, 1104 to the core 102, 1102 can include welding the abrasive segments 104, 1104 to the core 102, 1102. In particular, the welding process can include impinging a beam of energy at the base of each segment 104, 1104. More particularly, in the instance of a segment 104, 1104 having a backing region, welding can include impinging a beam of energy at the backing region between the abrasive segment 104, 1104 and the core 102, 1102. In particular instances, the beam of energy can be a laser, such that each abrasive segment 104, 1104 is attached to the core 102, 1102 via a laser welded bond joint. The laser may be a Roffin laser source commonly available from Dr. Fritsch, GmbH.

In one aspect, each segment 104, 1104 can be formed by pressing a green segment in a mold and curing the green segment. The pressing can include hot pressing or cold pressing. In another aspect, forming each segment 104, 1104 can include sintering a green segment, e.g., using an electro-discharge sintering process. In yet another aspect, forming each segment 104, 1104 can include the infiltration method described herein.

Each abrasive article 100, 1100 described herein can also be made by forming a plurality of segments 104, 1104 in which each segment 104, 1104 includes first segment indicia 150, 152 on a first face 144, 1144 and second segment indicia 152, 1152 on a second face 146, 1146. While the segments 104, 1104 on each respective abrasive article 100, 1100 are identical, each first segment indicia 150, 1150 is are mirror opposite of each respective second segment indicia 152, 1152. This method can also include arranging the segments 104, 1104 to establish a first abrasive article indicia 122, 1122 on a first side of a respective abrasive article 100, 1100 and a second abrasive article indicia 124, 1124 on a second side of the respective abrasive article 100, 1100. The first abrasive article indicia 122, 1122 can include a plurality of respective first segment indicia 150, 1152 and the second abrasive article indicia 124, 1124 can include a plurality of respective second segment indicia 152, 152. Further, the first abrasive article indicia 122 on the first abrasive article 100, described herein, is a mirror opposite of the second abrasive article indicia 124 and the first abrasive article indicia 1122 on the second abrasive article 1100, described herein, is a mirror opposite of the second abrasive article indicia 1124.

According to an embodiment, each abrasive article 100, 1100 can include a carrier element, e.g., a core 102, 1102, and an abrasive component, e.g., a segment 104, 1104. The abrasive article 100, 1100 can be a cutting tool for cutting construction materials, such as a saw for cutting concrete. Alternatively, the abrasive article 100, 1100 can be a grinding tool such as for grinding concrete or fired clay or removing asphalt.

While not shown, but clearly within the scope of the present disclosure, in another aspect, an abrasive article can be provided that includes both inter-segment gullets and intra-segment gullets having shaped gullet walls as described herein. In such an embodiment, the size and/or position of the segment indicia can be modified in order for both types of segment indicia to be formed in the segment to form the shaped gullet walls at the inter-segment gullets and the intra-segment gullets.

Further, in another aspect, also not show, but clearly within the scope of the present disclosure, an abrasive article can be provided that includes both the inter-segment gullets and the intra-segment gullets as described herein. However, in such an embodiment, the inter-segment gullets may include shaped gullet walls, as described herein, while the intra-segment gullets may not include shaped gullet walls. In other words, in this aspect, no part of the indicia, or recessed region thereof, may lie along the intra-segment gullet and the gullet wall around the intra-segment gullet can include a uniform width along the gullet wall.

Items.

Item 1. A segment for an abrasive article, the segment comprising:
  a segment body having:
    a first face extending along a length of the segment body on a first side of the segment body;
    a second face extending along the length of the segment body on a second side of the segment body opposite the first side;

a gullet wall extending from the first face to the second face, wherein the gullet wall extends along a gullet; and a recessed region extending into one or both of the first and second faces, the recessed region comprising a gullet portion extending at least partially along the gullet wall.

Item 2. An abrasive article, comprising:

a core having an outer circumferential wall; and a plurality of segments extending radially outward from the outer circumferential wall of the core, wherein each segment comprises:

a segment body having:

a first face extending along a length of the segment body on a first side of the segment body;

a second face extending along the length of the segment body on a second side of the segment body opposite the first side;

a gullet wall extending from the first face to the second face, wherein the gullet wall extends along a gullet; and a recessed region extending into one or both of the first and second faces, the recessed region comprising a gullet portion extending at least partially along the gullet wall.

Item 3. An abrasive article, comprising:

a core having an outer circumferential wall; and a plurality of segments extending radially outward from the outer circumferential wall of the core, wherein each segment comprises:

a segment body having:

a first face extending along a length of the segment body on a first side of the segment body;

a second face extending along the length of the segment body on a second side of the segment body opposite the first side;

a gullet wall extending from the first face to the second face, wherein the gullet wall extends along a gullet; and a recessed region extending into one or both of the first and second faces, the recessed region comprising a gullet portion extending at least partially along the gullet wall.

Item 4. The segment or abrasive article according to any one of items 1, 2, or 3, wherein the recessed region comprises a bilateral recessed region including a first recessed region extending into the first face and a second recessed region extending into the second face opposite the first recessed region.

Item 5. The segment or abrasive article according to item 4, wherein the first recessed region includes a first gullet portion extending at least partially along the gullet wall on the first side of the segment body and the second recessed region includes a second gullet portion extending at least partially along the gullet wall on the second side of the segment body.

Item 6. The segment or abrasive article according to item 4, wherein the first gullet portion and the second gullet portion are mirror images of each other.

Item 7. The segment or abrasive article according to any one of items 1, 2, or 3, wherein the gullet wall includes a length, $L_{GW}$, and the gullet portion of the recessed region extends along a length, $L_{GP}$, comprising a portion of $L_{GW}$, and $L_{GP} < L_{GW}$.

Item 8. The segment or abrasive article according to item 7, wherein $L_{GP} \leq 75\%$ $L_{GW}$, such as $\leq 70\%$ $L_{GP}$, $\leq 65\%$ $L_{GW}$, $\leq 60\%$ $L_{GW}$, $\leq 55\%$ $L_{GW}$, or $\leq 50\%$ $L_{GW}$.

Item 9. The segment or abrasive article according to item 8, wherein $L_{GP} \geq 25\%$ $L_{GW}$, such as $\geq 30\%$ $L_{GW}$, $\geq 35\%$ $L_{GW}$, or $\geq 40\%$ $L_{GW}$.

Item 10. The segment or abrasive article according to any one of items 1, 2, or 3, further comprising an intra-segment gullet bound by the gullet wall, wherein the intra-segment gullet extends partially into the segment body.

Item 11. The segment or abrasive article according item 10, wherein the segment comprises a height, $H_S$, measured along a central axis passing through a center of the core and the segment from an inner circumferential wall of the segment to an outer circumferential wall of the segment, and the intra-segment gullet comprises a depth, $D_G$, measured along a central axis bisecting the gullet, wherein $D_G < H_S$.

Item 12. The segment or abrasive article according to item 11, wherein $D_G \leq 80\%$ $H_S$, such $\leq 75\%$ $H_S$, $\leq 70\%$ $H_S$, or $\leq 65\%$ $H_S$.

Item 13. The segment or abrasive article according to item 12, wherein $D_G \geq 40\%$ $H_S$, such as $\geq 45\%$ $H_S$, $\geq 50\%$ $H_S$, $\geq 55\%$ $H_S$, or $\geq 60\%$ $H_S$.

Item 14. The segment or abrasive article according to any one of items 1, 2, or 3, wherein the segment body has a first thickness, $T_1$, measured between the first and second faces, and a second thickness, $T_2$, measured adjacent to the recessed region, and $T_2 < T_1$.

Item 15. The segment or abrasive article according to item 14, wherein $T_2 \leq 80\%$ $T_1$, such $\leq 75\%$ $T_1$, $\leq 70\%$ $T_1$, or $\leq 65\%$ $T_1$.

Item 16. The segment or abrasive article according to item 15, wherein $T_2 \geq 40\%$ $T_1$, such as $\geq 45\%$ $T_1$, $\geq 50\%$ $T_1$, $\geq 55\%$ $T_1$, or $\geq 60\%$ $T_1$.

Item 17. The segment or abrasive article according to any one of items 1, 2, or 3, wherein the gullet wall includes a first width, $W_1$, measured between the first and second faces, and a second width, $W_2$, measured through the gullet portion of the recessed region, and $W_2 < W_1$.

Item 18. The segment or abrasive article according to item 17, wherein $W_2 \leq 80\%$ $W_1$, such $\leq 75\%$ $W_1$, $\leq 70\%$ $W_1$, or $\leq 65\%$ $W_1$.

Item 19. The segment or abrasive article according to item 15, wherein $W_2 \geq 40\%$ $W_1$, such as $\geq 45\%$ $W_1$, $\geq 50\%$ $W_1$, $\geq 55\%$ $W_1$, or $\geq 60\%$ $W_1$.

Item 20. The segment or abrasive article according to any one of items 1, 2, or 3, wherein the first and second faces comprise a first surface roughness, $R_1$, and the first and second recessed regions comprise a second surface roughness, $R_2$, and $R_2 < R_1$.

Item 21. The segment or abrasive article according to item 20, wherein $R_2 \leq 50\%$ $R_1$, such $\leq 45\%$ $R_1$, $\leq 40\%$ $R_1$, or $\leq 35\%$ $T_1$.

Item 22. The segment or abrasive article according to item 24, wherein $R_2 \geq 1\%$ $R_1$, such as $\geq 2.5\%$ $R_1$ or $\geq 5\%$ $R_1$.

Item 23. The segment or abrasive article according to any one of items 1, 2, or 3, wherein the segment comprises a circumferential length, $L_S$, measured from the first radial sidewall to the second radial sidewall along the outer circumferential wall, and a gullet formed in the segment or a portion of a gullet adjacent to the segment comprises a width, $W_G$, measured along an axis perpendicular to an longitudinal axis bisecting the gullet, and $W_G < L_S$.

Item 24. The segment or abrasive article according to item 23, wherein $W_G \leq 20\%$ $L_S$, such $\leq 15\%$ $L_S$, or $\leq 10\%$ $L_S$.

Item 25. The segment or abrasive article according to item 24, wherein $W_G \geq 2.5\%$ $L_S$, such as $\geq 5\%$ $L_S$ or $\geq 7.5\%$ $L_S$.

Item 26. The segment or abrasive article according to any one of items 1, 2, or 3, wherein gullet wall extends along an inter-segment gullet formed between adjacent segments.

Item 27. The segment or abrasive article according to any one of items 1, 2, or 3, wherein a gullet formed in the segment or a portion of a gullet adjacent to the segment comprises a width, $W_G$, measured along an axis perpendicular to an longitudinal axis bisecting the gullet and the gullet portion of the recessed region comprises an overall width, $W_{RR}$, measured along the perpendicular axis or an axis parallel to the perpendicular axis, and $W_G<W_{RR}$.

Item 28. The segment or abrasive article according to item 27, wherein $W_G \leq 50\% W_{RR}$, such $\leq 45\% W_{RR}$, or $\leq 30\% W_{RR}$.

Item 29. The segment or abrasive article according to item 28, wherein $W_G \geq 5\% W_{RR}$, such as $\geq 10\% W_{RR}$ or $\geq 20\% W_{RR}$.

Item 30. The segment or abrasive article according to any one of items 1, 2, or 3, wherein the recessed region is a portion of an abrasive article indicia and the segment further comprises an intra-segment gullet at least partially and integrally formed with the abrasive article indicia.

Item 31. The segment or abrasive article according to any one of items 1, 2, or 3, wherein the recessed region is a portion of an abrasive article indicia and the segment flanks a portion of an inter-segment gullet at least partially and integrally formed with the abrasive article indicia.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive segment for an abrasive article, the segment comprising:
   a segment body having:
   a first face extending along a length of the segment body on a first side of the segment body;
   a second face extending along the length of the segment body on a second side of the segment body opposite the first side;
   a gullet wall extending from the first face to the second face, wherein the gullet wall extends along a gullet, and wherein the gullet wall has a length, $L_{GW}$, as measured along a periphery of the gullet wall; and
   a recessed region extending into one or both of the first and second faces, the recessed region comprising a gullet portion extending along the gullet wall a length, $L_{GP}$, wherein $L_{GP} \geq 25\% L_{GW}$.

2. The segment according to claim 1, wherein the recessed region comprises a bilateral recessed region including a first recessed region extending into the first face and a second recessed region extending into the second face opposite the first recessed region.

3. The segment according to claim 2, wherein the first recessed region includes a first gullet portion extending at least partially along the gullet wall on the first side of the segment body and the second recessed region includes a second gullet portion extending at least partially along the gullet wall on the second side of the segment body.

4. The segment according to claim 3, wherein the first gullet portion and the second gullet portion are mirror images of each other.

5. The segment according to claim 1, wherein the recessed region is disposed entirely in the segment body.

6. The segment according to claim 1, further comprising an intra-segment gullet bound by the gullet wall, wherein the intra-segment gullet extends partially into the segment body.

7. The segment according claim 6, wherein the segment comprises a height, $H_S$ measured along a central axis passing through a center of the core and the segment from an inner circumferential wall of the segment to an outer circumferential wall of the segment, and the intra-segment gullet comprises a depth, $D_G$, measured along a central axis bisecting the gullet, wherein $D_G<H_S$.

8. The segment according to claim 1, wherein the segment body has a first thickness, $T_1$, measured between the first and second faces, and a second thickness, $T_2$, measured adjacent to the recessed region, and $T_2<T_1$.

9. The segment according to claim 1, wherein the gullet wall includes a first width, $W_1$, measured between the first and second faces, and a second width, $W_2$, measured through the gullet portion of the recessed region, and $W_2<W_1$.

10. The segment according to claim 1, wherein the first and second faces comprise a first surface roughness, $R_1$, and the first and second recessed regions comprise a second surface roughness, $R_2$, and $R_2<R_1$.

11. The segment according to claim 1, wherein the segment comprises a circumferential length, $L_S$, measured from the first radial sidewall to the second radial sidewall along the outer circumferential wall, and a gullet formed in the segment or a portion of a gullet adjacent to the segment comprises a width, $W_G$, measured along an axis perpendicular to an longitudinal axis bisecting the gullet, and $W_G<L_S$.

12. The segment according to claim 1, wherein gullet wall extends along an inter-segment gullet formed between adjacent segments.

13. The segment according to claim 1, wherein a gullet formed in the segment or a portion of a gullet adjacent to the segment comprises a width, $W_G$, measured along an axis perpendicular to an longitudinal axis bisecting the gullet and the gullet portion of the recessed region comprises an overall width, $W_{RR}$, measured along the perpendicular axis or an axis parallel to the perpendicular axis, and $W_G<W_{RR}$.

14. The segment according to claim 1, wherein the recessed region is a portion of an abrasive article indicia and the segment further comprises an intra-segment gullet at least partially and integrally formed with the abrasive article indicia.

15. The segment according to claim 1, wherein the recessed region extends around the gullet from a first circumferential side of the gullet to a second circumferential side of gullet.

16. An abrasive article, comprising:
   a core having an outer circumferential wall; and
   a plurality of abrasive segments extending radially outward from the outer circumferential wall of the core, wherein each segment comprises:

a segment body having:
- a first face extending along a length of the segment body on a first side of the segment body;
- a second face extending along the length of the segment body on a second side of the segment body opposite the first side;
- a gullet wall extending from the first face to the second face, wherein the gullet wall extends along a gullet, and wherein the gullet wall has a length, $L_{GW}$, as measured along a periphery of the gullet wall; and
- a recessed region extending into one or both of the first and second faces, the recessed region comprising a gullet portion extending along the gullet wall a length, $L_{GP}$, wherein $L_{GP} \geq 25\% \, L_{GW}$.

17. The article according to claim 16, wherein the recessed region comprises a bilateral recessed region including a first recessed region extending into the first face and a second recessed region extending into the second face opposite the first recessed region.

18. The article according to claim 17, wherein the first recessed region includes a first gullet portion extending at least partially along the gullet wall on the first side of the segment body and the second recessed region includes a second gullet portion extending at least partially along the gullet wall on the second side of the segment body.

19. The article according to claim 16, further comprising an intra-segment gullet bound by the gullet wall, wherein the intra-segment gullet extends partially into the segment body.

20. An abrasive article, comprising:
- a core having an outer circumferential wall; and
- a plurality of abrasive segments extending radially outward from the outer circumferential wall of the core, wherein each segment comprises:
  - a segment body having:
    - a first face extending along a length of the segment body on a first side of the segment body;
    - a second face extending along the length of the segment body on a second side of the segment body opposite the first side;
    - a gullet wall extending from the first face to the second face, wherein the gullet wall extends along a gullet; and
    - a recessed region extending into one or both of the first and second faces, the recessed region comprising a gullet portion extending at least partially along the gullet wall and contained entirely within the segment so as to terminate prior to contacting the core.

* * * * *